(12) United States Patent
Brennan

(10) Patent No.: US 8,515,804 B2
(45) Date of Patent: Aug. 20, 2013

(54) SYSTEM AND METHOD FOR MANAGING PARTNER ORGANIZATIONS

(76) Inventor: Patrick J. Brennan, San Carlos, CA (US)

( * ) Notice: Subject to any disclaimer, the term of this patent is extended or adjusted under 35 U.S.C. 154(b) by 712 days.

(21) Appl. No.: 12/359,108

(22) Filed: Jan. 23, 2009

(65) Prior Publication Data

US 2009/0299802 A1    Dec. 3, 2009

Related U.S. Application Data

(60) Provisional application No. 61/023,039, filed on Jan. 23, 2008.

(51) Int. Cl.
*G06Q 10/00* (2012.01)
(52) U.S. Cl.
USPC .................. 705/7.39; 705/7.36; 705/7.28
(58) Field of Classification Search
USPC ....................... 705/7.36, 7.39, 7.28
See application file for complete search history.

(56) References Cited

U.S. PATENT DOCUMENTS

| | | | | |
|---|---|---|---|---|
| 5,726,914 | A * | 3/1998 | Janovski et al. | 702/84 |
| 5,737,494 | A * | 4/1998 | Guinta et al. | 706/47 |
| 6,556,974 | B1 * | 4/2003 | D'Alessandro | 705/10 |
| 2002/0099598 | A1 * | 7/2002 | Eicher et al. | 705/11 |
| 2002/0123945 | A1 * | 9/2002 | Booth et al. | 705/30 |
| 2003/0004779 | A1 * | 1/2003 | Rangaswamy et al. | 705/10 |
| 2003/0018513 | A1 * | 1/2003 | Hoffman et al. | 705/10 |
| 2003/0083947 | A1 * | 5/2003 | Hoffman et al. | 705/22 |
| 2003/0093340 | A1 * | 5/2003 | Krystek et al. | 705/28 |
| 2003/0158749 | A1 * | 8/2003 | Olchanski et al. | 705/2 |

OTHER PUBLICATIONS

Web.archive.org, PMGBenchmarking.com, Jun. 7, 2002, "Measure Your Performance", pp. 1-3.*
"Dimensions: Executive Summary", Jul. 2000, The Performance Measurement Group, pp. 1-4.*
Web.archive.org, PMGBenchmarking.com, Oct. 6, 2000, "Questions frequently asked by development professionals considering a subscriptions to the Product Development Benchmarking Series", pp. 1-4.*
Web.archive.org, PMGBenchmarking.com, Feb. 8, 2001, Supply-Chain Management Benchmarking Series—Tips & Slips, vol. 4: Subscriber Site Navigation, pp. 1-11.*
Web.archive.org, PMGBenchmarking.com, Sep. 18, 2000, "Our Mission", pp. 1.*
Web.archive.org, PMGBenchmarking.com, Dec. 6, 2000, "SAP Partnership", pp. 1.*
Web.archive.org, PMGBenchmarking.com, Feb. 10, 2001, "SAP Partnership—Continuous Performance Assessments", pp. 1.*
Web.archive.org, PMGBenchmarking.com, Feb. 8, 2001, Supply-Chain Management Benchmarking Series, pp. 1-3.*

(Continued)

*Primary Examiner* — Jonathan G Sterrett
(74) *Attorney, Agent, or Firm* — Schwegman, Lundberg & Woessner, P.A.

(57) ABSTRACT

A system and method of managing partner organizations. Partners and partner capabilities and objectives are defined. Partner capability questions are generated and partner capability facts are automatically collected from the partners. Gaps in partner capabilities are identified, wherein the gaps are a function of the collected partner capability facts. One or more partner capabilities are selected and automatically improved. Automatically improving includes informing each partner of gaps in their capabilities, automatically collecting partner capability facts relevant to the gaps and measuring improvement in the selected partner capabilities. Partner capabilities are monitored to ensure that improvements remain in place.

30 Claims, 28 Drawing Sheets

Three Disciplines to Improve Partner Capabilities (System 100)

(56) References Cited

OTHER PUBLICATIONS

"Improving performance and cutting costs", Jan. 2000, Strategic Direction, v16n1, pp. 1-4.*

PRTM Press release "High Tech Management Consultants PRTM Launch Online Benchmarking Company", Mar. 1, 1999. pp. 1-2.*

PRTM Press release "University of Michigan/OSAT and the Performance Measurment Group Launch a new Benchmarking Initiative for the Automotive Industry", Jan. 21, 2000, pp. 1-2.*

PRTM Press release "New Survey Addresses Product and Marketing Management", May 21, 1999, pp. 1.*

PRTM Press release "Fujitsu and PRTM/PMG Announce Supply-Chain Benchmarking and Consulting Collaboration in Japan", Mar. 1, 1999, pp. 1.*

SAP Press release "Industry standard benchmarking program", Jan. 20, 2000, pp. 1.*

PRTM Press release "The Performance Measurement Group Rolls out Product Development Benchmarking Series Online", Jun. 11, 1999, pp. 1-2.*

PRTM Press Release "SAP and PMG Introduce Industry-specific Key Performance Indicators for Supply-Chain Operations", Jan. 31, 2000, pp. 1-2.*

Web.archive.org, PMGBenchmarking.com, Feb. 8, 2001, "Supply-Chain Management Benchmarking Series", pp. 1-5.*

Web.archive.org, PMGBenchmarking.com, Feb. 10, 2001, "SAP Partnership—Peformance Snapshots", pp. 1-2.*

Web.archive.org, PMGBenchmarking.com, Jun. 2, 2002, "Signals of Performance", pp. 1-2.*

Web.archive.org, PMGBenchmarking.com, Jun. 8, 2002, "Webcasts", pp. 1-5.*

Web.archive.org, PMGBenchmarking.com, Feb. 8, 2001, "SAP Partnership—Product Offerings and Credentials", pp. 1.*

Web.archive.org, PMGBenchmarking.com, Feb. 10, 2001, "SAP Partnership—a research note published by AMR on the PMG/SAP Alliance", pp. 1-5.*

Web.archive.org, PMGBenchmarking.com, Dec. 6, 2000, "Product Development Benchmarking Series", pp. 1-2.*

Web.archive.org, PMGBenchmarking.com, Dec. 5, 2000, "Supply-Chain Management and Product Development Benchmarking Series", pp. 1-2.*

* cited by examiner

Figure 1. Three Disciplines to Improve Partner Capabilities (System 100)

PARTNER CAPABILITY IMPROVEMENT (PCI) METHOD
(TOP-LEVEL STEPS)

DEFINE

MEASURE

IMPROVE

CONTROL

CONDUCT SMALL-SCALE TEST

PLAN CAMPAIGN

Figure 11 Domain Objectives Examples

| Domain | Area | Unit | Capability |
|---|---|---|---|
| Business Continuity | Recovery | production site | Able to recover all production to alternate site in < 10 weeks |
| Business Continuity | Recovery | part | Able to recover all production to alternate site in < 10 weeks |
| Business Continuity | Fire Containment | production site | fire containment system exists at site |
| Business Continuity | Documentation | supplier | BCP document exists |
| Country of Origin | Training | production site | conducted CoO training within past year |
| Lead-Free | Policy | supplier | Reach 100% lead free parts by Dec 31, 2012 |
| Social Responsibility | Code of Conduct | supplier | Has documented Code of Conduct for employees |
| Social Responsibility | Child labor | supplier | No child labor in the past year |

Fig. 11

| PARTNER FORM | FIELD | FIELD TYPE | FOR WHICH DOMAINS IS THE FIELD RELEVANT? | | | | | ALL |
| --- | --- | --- | --- | --- | --- | --- | --- | --- |
| | | | BUSINESS CONTINUITY | COUNTRY OF ORIGIN | EU RoHS | LEAD-FREE | SOCIAL RESPONSIBILITY | |
| COMPANY | COMPANY NAME | TEXT | | | | | | YES |
| | D&B # | TEXT | | | | | | YES |
| | INDUSTRY CODE | DROP DOWN BOX | | | | | | YES |
| | DOCUMENT | BROWSE TO UPLOAD FILE FROM PC. AFTER A FILE IS UPLOADED, CLICK LINK TO OPEN | | | | | | YES |
| | WRITTEN CORPORATE POLICY | EXAMPLE OF "DOCUMENT" | | | | | | YES |
| | QUANTITATIVE FINANCIAL INFORMATION (E.G. INPUT FOR ALTMAN Z MODEL) | NUMBER | YES | | | | | |
| | QUALITATIVE FINANCIAL INFORMATION | BOOLEAN/ DROP DOWN BOX | YES | | | | | |
| SITE | SITE NAME | TEXT | | | | | | YES |
| | ADDRESS | TEXT. COUNTRY IS A DROP DROP DOWN BOX | | | | | | YES |
| | INDUSTRY CODE | DROP DOWN BOX | | | | | | YES |
| | PRODUCTION ACTIVITY | DROP DOWN BOX | | | | | | YES |
| | TECHNOLOGY | DROP DOWN BOX | | | | | | YES |
| | EMERGENCY CONTACT | DROP DOWN BOX. BUTTON TO ADD NE CONTACT | | | | | | YES |
| | SUBCONTRACTOR COMPANY NAME | TEXT | YES | | | | | |
| | ALTERNATE SITE | DROP DOWN BOX | YES | | | | | |
| | TIME TO RECOVER | TEXT | YES | | | | | |
| | LATITUDE, LONGITUDE (ADDED LATER) | NUMBER | YES | | | | | |
| | SITE DOCUMENT | "DOCUMENT" | | | | | | YES |
| | HAVE YOU TESTED WRITTEN CRISIS MANAGEMENT AND RECOVERY PROCEDURES FOR THIS SITE IN THE PAST 12 MONTHS? | BOOLEAN | YES | | | | | |
| | EVIDENCE OF LATEST TEST OF CRISIS MANAGEMENT AND RECOVERY PROCEDURES | EXAMPLE OF "DOCUMENT" | YES | | | | | |
| | FIRE CONTAINMENT SYSTEM | BOOLEAN | YES | | | | | |
| | IS THIS SITE REQUIRED BY LAW TO LABEL COUNTRY OF ORIGIN? | BOOLEAN | | YES | | | | |
| | ARE THERE ENFORCEMENT ACTIONS OR PENALTIES ASSOCIATED WITH THE COUNTRY OR ORIGIN LABELING PROGRAM IN YOUR HOST COUNTRY? | BOOLEAN | | YES | | | | |
| | HOW OFTEN ARE PRODUCTS CORRECTLY LABELED WITH COUNTRY OF ORIGIN? | NUMBER | | YES | | | | |
| | DOES YOUR COUNTRY OF ORIGIN LABELING MEET NAFTA & TAA ORIGIN AND MARKING REQUIREMENTS? | BOOLEAN | | YES | | | | |
| | WHICH HAZARDOUS SUBSTANCES | TEXT | | | YES | | | |

*Fig. 12A*

| Category | Field | Type | C1 | C2 | C3 | C4 | C5 | C6 |
|---|---|---|---|---|---|---|---|---|
|  | HAZARD CLASSIFICATION | DROP DOWN BOX |  |  | YES |  |  |  |
|  | LEAD IN SOLDER | BOOLEAN |  |  |  | YES |  |  |
|  | LEAD PAINT | BOOLEAN |  |  |  | YES |  |  |
|  | OTHER LEAD | BOOLEAN |  |  |  | YES |  |  |
|  | WHEN REACH 100% LEAD-FREE FOR PRODUCTS WE PURCHASE | INTEGER WITH RANGE CHECK |  |  |  | YES |  |  |
|  | IS CHILD LABOR (AS DEFINED BY THE LAWS THAT APPLY TO YOUR SITE) SOMETIMES USED? | BOOLEAN |  |  |  |  | YES |  |
|  | ANY FINES FOR VIOLATIONS OF LABOR LAWS IN THE PAST YEAR? | BOOLEAN |  |  |  |  | YES |  |
|  | IS A CODE OF CONDUCT POSTED AT THIS SITE? | BOOLEAN |  |  |  |  | YES |  |
|  | ENVIRONMENT- RELEASED WASTE OR TOXIC CHEMICALS IN PAST YEAR? | BOOLEAN |  |  |  |  | YES |  |
|  | SAFETY- ANY FATAL INJURIES AT THIS SITE IN THE PAST YEAR? | BOOLEAN |  |  |  |  | YES |  |
| PART-SITE | MANU. PART # | TEXT | YES | YES | YES | YES |  |  |
|  | ORG. PART # | TEXT | YES | YES | YES | YES |  |  |
|  | PRODUCTION SITE | DROP DOWN BOX | YES | YES | YES | YES |  |  |
|  | PRODUCTION ACTIVITY | DROP DOWN BOX | YES |  |  |  |  |  |
|  | TECHNOLOGY | DROP DOWN BOX |  |  |  |  |  |  |
|  | ALTERNATE SITE | DROP DOWN BOX | YES |  |  |  |  |  |
|  | TIME TO RECOVER | NUMERIC | YES |  |  |  |  |  |
| CONTACT | CONTACT INFO SUCH AS NAME, TITLE, EMAIL, TELEPHONES, ETC. |  |  |  |  |  |  | YES |
|  | ROLE | DROP DOWN BOX |  |  |  |  |  | YES |
| PARTNER'S CRITICAL SUPPLIER INFO (FOR KEY MATERIALS OR SUBCOMPONENTS IN SHORT SUPPLY; CRITICAL SERVICES SHARED BY OTHER PARTNERS IN THE REGION) | | | | | | | | |
|  | SUPPLIER NAME | TEXT | YES |  |  |  |  |  |
|  | ACTIVITY | DROP DOWN BOX | YES |  |  |  |  |  |
|  | ADDRESS | TEXT. COUNTRY IS A DROP DOWN BOX | YES |  |  |  |  |  |
|  | LATITUDE, LONGITUDE (ADDED LATER) | NUMBER | YES |  |  |  |  |  |
|  | PRODUCT OR SERVICE TYPE | DROP DOWN BOX | YES |  |  |  |  |  |
|  | PRODUCT OR SERVICE NAME | TEXT |  |  |  |  |  |  |

*Fig. 12B*

Figure 13 Partner Capability Review Guideline (example, initial portion only)

| Partner Name: | |
|---|---|
| Partner Document Date and Version: | |
| Partner Document Name: | |

| # | Guideline | Yes/No | Page # in Doc | Comment -Optional |
|---|---|---|---|---|
| 1.1 | <u>Crisis Management</u> – Answer Yes if the documented procedure includes:<br>• Defined crisis process trigger<br>• Emergency contact information for the members of the crisis management team<br>• Initial notification of the crisis management team<br>• Communication frequency to the crisis management team<br>Content template for emailed situation reports | | | |
| 1.2 | <u>Recovery</u> – Answer Yes if documentation shows alternate resources, alternate procedures and recovery times for the following:<br>• Voice telecommunications<br>• Data communications<br>• Labor<br>• Facility<br>• IT server | | | |
| 1.3 | • Was the recovery procedure tested in the past 12 months? | | | |
| 1.4 | • Does the site have a fire containment system (e.g. sprinklers)? | | | |

Database Tables (Primary & Foreign Keys Only)

ACTIVITY_TYPE

| Columns | | |
|---|---|---|
| Name | Type | Nullable |
| ID | PRIMARY | No |

CONTACT

| Columns | | |
|---|---|---|
| Name | Type | Nullable |
| ID | PRIMARY | No |
| PHONE_CC_ID | FOREIGN | Yes |
| PHONE_TYPE_ID | FOREIGN | Yes |
| VERIFIED_BY | FOREIGN | Yes |

CONTACT_ROLE

| Columns | | |
|---|---|---|
| Name | Type | Nullable |
| ID | PRIMARY | No |

CONTENT_TYPE

| Columns | | |
|---|---|---|
| Name | Type | Nullable |
| ID | PRIMARY | No |

CYCLE

| Columns | | |
|---|---|---|
| Name | Type | Nullable |
| ID | PRIMARY | No |

DIVISION

| Columns | | |
|---|---|---|
| Name | Type | Nullable |
| ID | PRIMARY | No |

DOCUMENT

| Columns | | |
|---|---|---|
| Name | Type | Nullable |
| CONTENT_TYPE_ID | FOREIGN | Yes |
| DOCUMENT_TYPE_ID | FOREIGN | Yes |
| ID | PRIMARY | No |

DOCUMENT_TYPE

| Columns | | |
|---|---|---|
| Name | Type | Nullable |
| ID | PRIMARY | No |

PART

| Columns | | |
|---|---|---|
| Name | Type | Nullable |
| ID | PRIMARY | No |

*Fig. 14A*

SITE

| Columns | | |
|---|---|---|
| Name | Type | Nullable |
| COUNTRY_ID | FOREIGN | Yes |
| ID | PRIMARY | No |
| SHARED_SITE_ID | FOREIGN | Yes |
| SUBCOMPONENT_ID | FOREIGN | Yes |
| SUBCONTRACTOR_ID | FOREIGN | Yes |
| SUPPLIER_ID | FOREIGN | Yes |
| VERIFIED_BY | FOREIGN | Yes |

SITE_ALT

| Columns | | |
|---|---|---|
| Name | Type | Nullable |
| CYCLE_ID | FOREIGN | Yes |
| ID | PRIMARY | No |
| SITE_ACTIVITY_TYPE_ID | FOREIGN | Yes |
| SITE_ALT1_ID | FOREIGN | Yes |
| TECHNOLOGY_TYPE_ID | FOREIGN | Yes |

SITE_DOCUMENT

| Columns | | |
|---|---|---|
| Name | Type | Nullable |
| CYCLE_ID | FOREIGN | Yes |
| DOCUMENT_ID | FOREIGN | Yes |
| ID | PRIMARY | No |
| SITE_ID | FOREIGN | Yes |

SITE_PART

| Columns | | |
|---|---|---|
| Name | Type | Nullable |
| ACTIVITY_TYPE_ID | FOREIGN | Yes |
| CYCLE_ID | FOREIGN | Yes |
| ERROR_ID | FOREIGN | Yes |
| ID | PRIMARY | No |
| PART_ID | FOREIGN | Yes |
| SITE_ALT1_ID | FOREIGN | Yes |
| SITE_ID | FOREIGN | Yes |
| SUPPLIER_ID | FOREIGN | Yes |
| TECHNOLOGY_TYPE_ID | FOREIGN | Yes |

SUBCOMPONENT

| Columns | | |
|---|---|---|
| Name | Type | Nullable |
| ID | PRIMARY | No |

SUPPLIER

| Columns | | |
|---|---|---|
| Name | Type | Nullable |
| ID | PRIMARY | No |

*Fig. 14B*

SUPPLIER_CONTACT

| Columns | | |
|---|---|---|
| Name | Type | Nullable |
| CONTACT_ID | FOREIGN | Yes |
| CONTACT_ROLE_ID | FOREIGN | Yes |
| ID | PRIMARY | No |
| SUPPLIER_ID | FOREIGN | Yes |

SUPPLIER_DIVISION

| Columns | | |
|---|---|---|
| Name | Type | Nullable |
| DIVISION_ID | FOREIGN | Yes |
| ID | PRIMARY | No |
| SUPPLIER_ID | FOREIGN | Yes |

SUPPLIER_DOCUMENT

| Columns | | |
|---|---|---|
| Name | Type | Nullable |
| CYCLE_ID | FOREIGN | Yes |
| DOCUMENT_ID | FOREIGN | Yes |
| ID | PRIMARY | No |
| SUPPLIER_ID | FOREIGN | Yes |
| TEMPLATE_DOCUMENT_ID | FOREIGN | Yes |

SUPPLIER_PART

| Columns | | |
|---|---|---|
| Name | Type | Nullable |
| CYCLE_ID | FOREIGN | Yes |
| ID | PRIMARY | No |
| PART_ID | FOREIGN | Yes |
| SUPPLIER_ID | FOREIGN | Yes |
| SUPPLIER_PART_ID | FOREIGN | Yes |

SUPPLIER_SURVEY

| Columns | | |
|---|---|---|
| Name | Type | Nullable |
| COMPLETED_BY | FOREIGN | Yes |
| ID | PRIMARY | No |
| PARENT_ID | FOREIGN | Yes |
| RATING_GROUP_ID | FOREIGN | Yes |
| REVIEWED_BY | FOREIGN | Yes |
| SUPPLIER_ID | FOREIGN | Yes |
| SURVEY_ID | FOREIGN | Yes |
| VERIFIED_BY | FOREIGN | Yes |

SUPPLIER_SURVEY_ITEM

| Columns | | |
|---|---|---|
| Name | Type | Nullable |
| ID | PRIMARY | No |
| ITEM_ID | FOREIGN | Yes |

*Fig. 14C*

| SUPPLIER_SURVEY_ID | FOREIGN | Yes |
|---|---|---|

SUPPLIER_SURVEY_ITEM_COMPLETENESS

| Columns | | |
|---|---|---|
| Name | Type | Nullable |
| COMPLETED_BY | FOREIGN | Yes |
| ID | PRIMARY | No |
| ITEM_ID | FOREIGN | Yes |
| SUPPLIER_SURVEY_ID | FOREIGN | Yes |

SUPPLIER_SURVEY_ITEM_EVIDENCE

| Columns | | |
|---|---|---|
| Name | Type | Nullable |
| DOCUMENT_ID | FOREIGN | Yes |
| ID | PRIMARY | No |
| ITEM_ID | FOREIGN | Yes |
| SUPPLIER_SURVEY_ID | FOREIGN | Yes |

SUPPLIER_TYPE

| Columns | | |
|---|---|---|
| Name | Type | Nullable |
| ID | PRIMARY | No |
| SUPPLIER_TYPE_GROUP_ID | FOREIGN | Yes |

SURVEY

| Columns | | |
|---|---|---|
| Name | Type | Nullable |
| ID | PRIMARY | No |

SURVEY_FINANCIAL_DATA

| Columns | | |
|---|---|---|
| Name | Type | Nullable |
| ALTMANZ_RATING_GROUP_ID | FOREIGN | Yes |
| CURRENCY_ID | FOREIGN | Yes |
| CYCLE_ID | FOREIGN | Yes |
| ID | PRIMARY | No |
| QUALITATIVE_RATING_GROUP_ID | FOREIGN | Yes |
| SUPPLIER_SURVEY_ID | FOREIGN | Yes |
| THIRD_PARTY_RATING_GROUP_ID | FOREIGN | Yes |

SURVEY_ITEM

| Columns | | |
|---|---|---|
| Name | Type | Nullable |
| CONTROL_ID | FOREIGN | Yes |
| ID | PRIMARY | No |
| LIST_ID | FOREIGN | Yes |
| PARENT_ID | FOREIGN | Yes |
| RATING_GROUP_ID | FOREIGN | Yes |
| STANDARD_LIST_ID | FOREIGN | Yes |
| SURVEY_ID | FOREIGN | Yes |

*Fig. 14D*

| TYPE_ID | FOREIGN | Yes |
|---|---|---|

SURVEY_ITEM_CONTROL

| Columns | | |
|---|---|---|
| Name | Type | Nullable |
| ID | PRIMARY | No |

SURVEY_ITEM_LIST

| Columns | | |
|---|---|---|
| Name | Type | Nullable |
| ID | PRIMARY | No |

SURVEY_RATING_GROUP

| Columns | | |
|---|---|---|
| Name | Type | Nullable |
| ID | PRIMARY | No |

SYS_CONFIG

| Columns | | |
|---|---|---|
| Name | Type | Nullable |
| ID | PRIMARY | No |

SYS_USER

| Columns | | |
|---|---|---|
| Name | Type | Nullable |
| CONTACT_ID | FOREIGN | Yes |
| ID | PRIMARY | No |
| USER_ID | FOREIGN | Yes |

TECHNOLOGY_TYPE

| Columns | | |
|---|---|---|
| Name | Type | Nullable |
| ID | PRIMARY | No |

*Fig. 14E*

```
PROCEDURES
ACCOUNT_SELECT_BY_SURVEY_ID
CATALOG_DATA_IMPORT_REPORT
CONTACT_DELETE_BY_ID
CONTACT_DETAILS_SELECT_BY_SUPPLIER_ID
CONTACT_FILTER_BY_SUPPLIER_EMAIL_ROLE
CONTACT_INSERT
CONTACT_REQUEST_DELETE_BY_ID
CONTACT_REQUEST_INSERT
CONTACT_REQUEST_SELECT_BY_ALL
CONTACT_REQUEST_UPDATE_BY_ID
CONTACT_ROLE_ALL_SELECT_BY_CONTACT_ID
CONTACT_ROLE_SELECT_ALL
CONTACT_ROLE_SELECT_BY_CONTACT_ID
CONTACT_ROLE_UPDATE_BY_CONTACT_ID
CONTACT_SELECT_ALL_BY_SUPPLIER_ID
CONTACT_SELECT_BY_ID
CONTACT_SELECT_BY_SUPPLIER_ID
CONTACT_SELECT_BY_SUPPLIER_ID_CONTACT_ROLE_CODE
CONTACT_SELECT_COUNT_BY_SUPPLIER_ID
CONTACT_UPDATE_BY_ID
COUNTRY_CODE_SELECT_ALL
COUNTRY_SELECT_ALL
CYCLE_INSERT
CYCLE_SELECT_ALL
DOCUMENT_DELETE_BY_ID
DOCUMENT_INSERT
DOCUMENT_INSERT_BY_TEMPLATE_DOC_ID
DOCUMENT_SELECT_BY_ID
DOCUMENT_SELECT_BY_SUPPLIER_ID
DOCUMENT_SELECT_CONTENT_BY_ID
DOCUMENT_SELECT_COUNT_BY_SUPPLIER_ID
DOCUMENT_TYPE_SELECT_BY_ACCESS_MASK
DOCUMENT_UPDATE_BY_ID
LOGIN_INFO
PART_ALT_EXERCISE_SELECT_BY_SUPPLIER_ID
PART_ALT_EXERCISE_UPDATE_BY_SUPPLIER_ID
```

*Fig. 15A*

```
SITE_ACTIVITY_TYPE_GROUP_SELECT_BY_SUPPLIER_ID
SITE_ACTIVITY_TYPE_SELECT_BY_SITE_ID
SITE_ACTIVITY_TYPE_UPDATE_BY_SITE_ID
SITE_ACTIVITY_TYPE_UPDATE_BY_SITE_ID_ACTIVITY_TYPE_ID
SITE_ALT_PROGRESS_BY_SUPPLIER_ID
SITE_ALT_SELECT_BY_SITE_ID
SITE_ALT_SELECT_BY_SUPPLIER_ID
SITE_ALT_SELECT_COUNT_BY_OBJECT_ID
SITE_ALT_UPDATE_BY_ID
SITE_ALT_UPDATE_BY_SITE_ID
SITE_ALT_UPDATE_BY_SITE_ID_ACTIVITY_TYPE_ID
SITE_APPROVAL_SELECT_BY_SITE_ID
SITE_APPROVAL_UPDATE_BY_SITE_ID
SITE_BUSINESS_UNIT_SELECT_BY_SITE_ID
SITE_BUSINESS_UNIT_UPDATE_BY_SITE_ID
SITE_CONTACT_UPDATE_BY_SITE_ID
SITE_DELETE_BY_ID
SITE_DETAILS_SELECT_BY_SUPPLIER_ID
SITE_DOCUMENT_SELECT_BY_DOCUMENT_ID
SITE_DOCUMENT_UPDATE_BY_DOCUMENT_ID
SITE_INSERT
SITE_PART_EDIT_DELETE_BY_SUPPLIER_ID
SITE_PART_EDIT_EXPORT_BY_SUPPLIER_ID
SITE_PART_EDIT_IMPORT_BY_SUPPLIER_ID
SITE_PART_EDIT_SELECT_BY_SUPPLIER_ID
SITE_PART_EDIT_SELECT_COUNT_BY_SUPPLIER_ID
SITE_PART_EDIT_UPDATE_BY_ACTIVITY_TYPE_ID
SITE_PART_EDIT_UPDATE_BY_SITE_NAME
SITE_PART_EDIT_UPDATE_BY_SUPPLIER_ID
SITE_PART_IMPORT_BATCH_INSERT
SITE_PART_IMPORT_BY_SUPPLIER_ID
SITE_PART_IMPORT_INSERT
SITE_PART_IMPORT_SELECT_ERRORS
SITE_PART_IMPORT_SITE_INSERT
SITE_PART_PROGRESS_BY_SUPPLIER_ID
SITE_PART_SELECT_BY_SUPPLIER_ID
SITE_PART_SELECT_COUNT_BY_OBJECT_ID
SITE_PART_UPDATE_BY_ACTIVITY_TYPE_ID
```

*Fig. 15B*

```
SITE_PART_UPDATE_BY_ID
SITE_PART_UPDATE_BY_SITE_ID
SITE_PART_UPDATE_BY_SUPPLIER_ID
SITE_SELECT_ALT_BY_SITE_ID
SITE_SELECT_BY_ID
SITE_SELECT_BY_SUPPLIER_ID
SITE_SELECT_COUNT_BY_SUPPLIER_ID
SITE_SHARED_FILTER_BY_NAME_ADDRESS
SITE_SUBCOMPONENT_SELECT_BY_SITE_ID
SITE_SUBCOMPONENT_SELECT_BY_SUPPLIER_ID
SITE_SUBCOMPONENT_UPDATE_BY_SITE_ID
SITE_SUBCOMPONENT_UPDATE_BY_SITE_ID_ACTIVITY_TYPE_ID
SITE_UPDATE_BY_ID
SUBCOMPONENT_OTHER_SELECT_BY_SUPPLIER_ID
SUBCOMPONENT_OTHER_UPDATE_BY_SUPPLIER_ID
SUBCOMPONENT_PROGRESS_BY_SUPPLIER_ID
SUPPLIER_APPROVAL_SELECT_BY_SUPPLIER_ID
SUPPLIER_APPROVAL_UPDATE_BY_SUPPLIER_ID
SUPPLIER_CONTACT_DELETE_BY_SUPPLIER_ID_CONTACT_ID_CONTACT_ROLE_ID
SUPPLIER_DIVISION_SELECT_BY_SUPPLIER_ID
SUPPLIER_DIVISION_UPDATE_BY_SUPPLIER_ID
SUPPLIER_FILTER_BY_COMPLETED_VERIFIED
SUPPLIER_FILTER_BY_WORKFLOW_APPROVED
SUPPLIER_FILTER_LIST
SUPPLIER_INSERT
SUPPLIER_PART_DELETE_BY_ID
SUPPLIER_PART_FILTER_BY_CYCLE_SUPPLIER_PART
SUPPLIER_PART_INSERT
SUPPLIER_PART_SELECT_BY_ID
SUPPLIER_PART_UPDATE_BY_ID
SUPPLIER_SELECT_ALL
SUPPLIER_SELECT_BY_ID
SUPPLIER_SUBCOMPONENT_CHECKED_SELECT_BY_SUPPLIER_ID
SUPPLIER_SUBCOMPONENT_SELECT_BY_SUPPLIER_ID
SUPPLIER_SUBCOMPONENT_UPDATE_BY_SUPPLIER_ID_SUBCOMPONENT_ID
SUPPLIER_SUPPLIER_TYPE_CHECKED_SELECT_BY_SUPPLIER_ID
SUPPLIER_SUPPLIER_TYPE_SELECT_BY_SUPPLIER_ID
SUPPLIER_SUPPLIER_TYPE_UPDATE_BY_SUPPLIER_ID
```

Fig. 15C

SUPPLIER_SURVEY_ITEM_DELETE_BY_ID
SUPPLIER_SURVEY_ITEM_EVIDENCE_SELECT_BY_DOCUMENT_ID
SUPPLIER_SURVEY_ITEM_EVIDENCE_SELECT_BY_SURVEY_ID_SUPPLIER_ID_GROUP_ID
SUPPLIER_SURVEY_ITEM_EVIDENCE_UPDATE_BY_DOCUMENT_ID
SUPPLIER_SURVEY_ITEM_GRID_LAYOUT_SELECT_BY_ITEM_ID
SUPPLIER_SURVEY_ITEM_INSERT_BY_ID
SUPPLIER_SURVEY_ITEM_RESPONSE_SELECT_BY_SURVEY_ID_SUPPLIER_ID
SUPPLIER_SURVEY_ITEM_SELECT_BY_SURVEY_ID_SUPPLIER_ID
SUPPLIER_SURVEY_ITEM_SELECT_BY_SURVEY_ID_SUPPLIER_ID_PARENT_ID
SUPPLIER_SURVEY_ITEM_SELECT_COUNT_BY_SURVEY_ID_SUPPLIER_ID
SUPPLIER_SURVEY_ITEM_UPDATE_BY_ID
SUPPLIER_SURVEY_ITEM_UPDATE_BY_REF_ID
SUPPLIER_SURVEY_ITEM_WORKFLOW_SELECT_BY_ID
SUPPLIER_SURVEY_ITEM_WORKFLOW_UPDATE_BY_ID
SUPPLIER_SURVEY_SELECT_BY_SUPPLIER_ID
SUPPLIER_SURVEY_UPDATE_BY_SUPPLIER_ID
SUPPLIER_UPDATE_BY_ID
SUPPLIER_UPDATE_STATUS_BY_ID
SUPPLIER_VERIFY_ALL_BY_ID
SUPPLIER_WORKFLOW_APPROVE_BY_ID
SUPPLIER_WORKFLOW_SELECT_BY_SUPPLIER_ID
SUPPLIER_WORKFLOW_UPDATE_BY_SUPPLIER_ID
SURVEY_COMPLETE_BY_ID
SURVEY_CONFIRM_BY_ID
SURVEY_FINANCIAL_DATA_SELECT_BY_SUPPLIER_ID
SURVEY_FINANCIAL_DATA_UPDATE_BY_ID
SURVEY_ITEM_COMPLETENESS_SELECT_BY_SURVEY_ID
SURVEY_ITEM_PROGRESS_SELECT_BY_SURVEY_ID_ITEM_CODE
SURVEY_ITEM_PROGRESS_UPDATE_BY_SURVEY_ID_ITEM_CODE
SURVEY_ITEM_RULES_SELECT_BY_SURVEY_ID_PARENT_ID
SURVEY_ITEM_VALUE_SELECT_BY_LIST_ID
SURVEY_SELECT_ALL
SURVEY_SELECT_BY_CODE
SURVEY_SELECT_BY_ID
SURVEY_SELECT_BY_USER_NAME
SYS_USER_INSERT
USER_SET_MUST_CHANGE_PASSWORD_BY_USER_ID
WORKFLOW_SELECT_ALL

*Fig. 15D*

```
TABLE_FUNCTIONS
ACTIVITY_TYPE_GROUP_SELECT_BY_SUPPLIER_ID
CATALOG_DATA_DOCUMENT_LIST
CATALOG_DATA_PREPARE_STEP
CATALOG_DATA_SUPPLIER_LIST
LOGIN_PERMISSION
SITE_ALTS_SELECT_BY_SUPPLIER_ID
SITE_PART_EXPORT_BY_SUPPLIER_ID
SITE_PRODUCTION_SELECT_BY_SUPPLIER_ID
SUPPLIER_ACTIVITY_TYPE_GROUPS
SUPPLIER_ALTERNATE_SITE_COMPLETENESS
SUPPLIER_APPROVAL_REQUIRED
SUPPLIER_APPROVED
SUPPLIER_BCF_DATA
SUPPLIER_BCF_DATA_COMPLETENESS
SUPPLIER_BCM_DATA
SUPPLIER_BCM_DATA_COMPLETENESS
SUPPLIER_CONTACT_COMPLETENESS
SUPPLIER_CONTACT_ROLE_COMPLETENESS
SUPPLIER_DELETED_IN_RANGE
SUPPLIER_DOCUMENT_COMPLETENESS
SUPPLIER_DOCUMENTS
SUPPLIER_LOGGED_IN_SINCE
SUPPLIER_PARTS
SUPPLIER_PARTS_COMPLETENESS
SUPPLIER_SITE_ALT_COMPLETENESS
SUPPLIER_SITE_APPROVAL_COMPLETENESS
SUPPLIER_SITE_COMPLETENESS
SUPPLIER_SITE_DOCUMENT_COMPLETENESS
SUPPLIER_SITE_SUBCOMPONENT_COMPLETENESS
SUPPLIER_SITES
SUPPLIER_STATUS
SUPPLIER_SUBCOMPONENT_COMPLETENESS
SUPPLIER_SUBCOMPONENTS
SUPPLIER_TYPE_COMPLETENESS
SUPPLIER_UPDATED_IN_RANGE
SUPPLIER_WORKFLOW_REQUIRED
SURVEY_ITEM_PROGRESS_SELECT_BY_SURVEY_ID_ITEM_ID
```

Fig. 15E

SYS_MESSAGE_GET_MESSAGES_RANGE_BY_ORD
TECHNOLOGY_SELECT_ALL
TECHNOLOGY_SELECT_BY_ACTIVITY_TYPE_NAME

FUNCTIONS

ACTIVITY_TECHNOLOGY_GET_SUBPART
CATALOG_DATA_PREPARE_DOCUMENT_CONTENT
CATALOG_DATA_PREPARE_DOCUMENT_HASHCODE
CATALOG_DATA_PREPARE_STEP_CONTENT
CATALOG_DATA_PREPARE_SUPPLIER_FEED
CATALOG_DATA_PREPARE_SURVEY
CONTACT_EMAIL_GET_LIST
CONTACT_GET_KEY_BY_USER_NAME
CONTACT_GET_PHONE_NUMBER
CONTACT_ROLE_GET_LIST
CONTENT_TYPE_GET_LIST
CONTENT_TYPE_GET_NAME
COUNTRY_GET_ISO2_BY_COUNTRY_ID
COUNTRY_STATE_GET_BY_COUNTRY_ID_STATE
DOCUMENT_GET_NORMALIZED_FILE_NAME
REPORT_SUPPLIER_DOCUMENT_UPLOADED
REPORT_SUPPLIER_REVIEWED_VERIFIED
SITE_PART_EDIT_SELECT_ACTIVITY_GET_LIST
SITE_SUBCOMPONENT_SUPPLIER
SUBCOMPONENT_GET_LIST
SUPPLIER_TYPE_GET_LIST
SURVEY_GET_GRID_COLUMNS
SURVEY_ITEM_GAP_SUBST_PARAMS
SURVEY_ITEM_SUBST_PARAMS
SURVEY_QUESTION_GET_LIST
SYS_MESSAGE_SUBST_MSG_PARAMS
USER_ROLE_GET_LIST

*Fig. 15F*

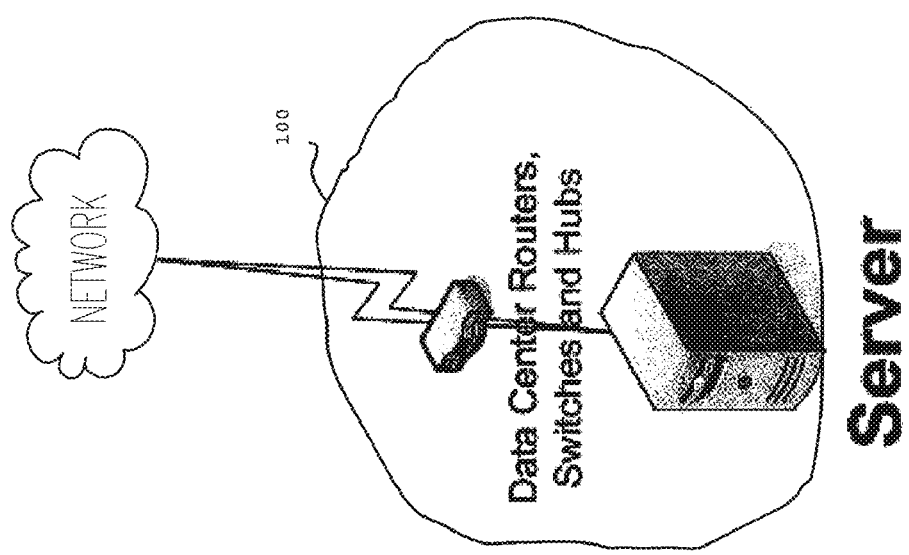
Figure 16. System for Managing Partner Organizations on a Computer Connected to a Network Figure 17 Comparison of PCI vs. DMAIC-Six Sigma

| Characteristic | DMAIC | PCI |
|---|---|---|
| # Organizations Focused On | One (internal to the organization) | External partner organizations (many dozens, hundreds or thousands) |
| Improvement Objective | Less process variation | Better parter capabilities |
| Measurement | Defects in a single internal process | Current capabilities in one or more partner domains |
| # Measurements to Focus on | Few. Tries to identify the few key sources of variation for an internal process | Dozen or hundreds across one or more domains |
| Type of Domain Expert needed | DMAIC blackbelt | Expert in partner domain, e.g. environment, business continuity, health & safety |
| Automation | Standard statistical functions only | Software is critical to every step -- impossible without it. No statistics required. |
| Mass outreach & support processes | Not applicable | Critical to PCI (e.g. see "Plan Campaign" "Execute Campaign") |
| "Define" step | Document customer issues | Input organization's capability objectives into System |
| "Measure" step | Quantify defects in internal process | Interact with partners to gather their current capabilities. Also correct & augment data |
| "Analyze" step | Statistical analysis to find the most important source of process variation | Automatically assess gaps and make recommendations |
| "Improve" step | Implement a solution and measures success | Follow-up, track and offer self-help aids to close gaps |
| "Control" step | Institutionalize process changes through training, etc. | Periodically ask partners for updates. Plan for continuous improvement |

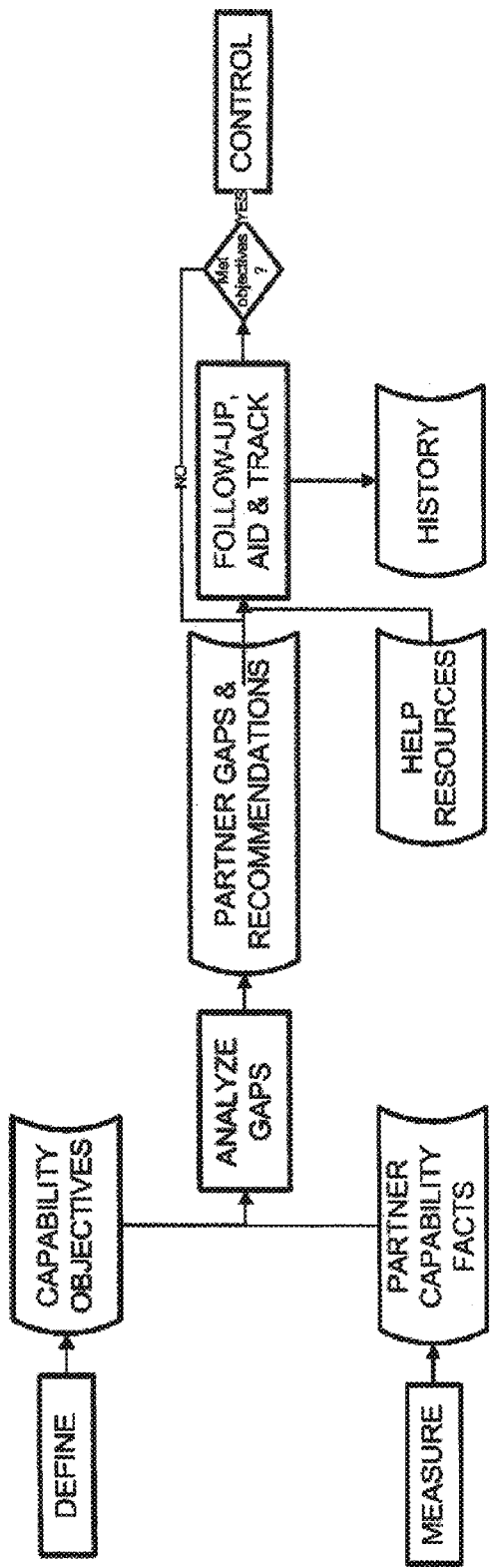

SYSTEM AND METHOD FOR MANAGING PARTNER ORGANIZATIONS

RELATED APPLICATION

This application claims priority to, and incorporates by reference under 35. U.S.C. Section 119(e), U.S. Provisional Patent Application Ser. No. 61/023,039, filed Jan. 23, 2008.

BACKGROUND OF THE INVENTION

1. Field of the Invention

The present invention is related to software, and more particularly to a system and method for managing partner organizations.

2. Background Information

It is critical for an organization that relies on partner organizations to ensure that its partners have capabilities in place to consistently meet the organization's objectives. Examples of organizations that rely on many partners include:

Product manufacturers with large supply chains that provide raw materials, components and outsourced production services;

Businesses that rely on other organizations substantially for sales and distribution services;

Government organizations that rely on a network of external partners that deliver related products and services to address constituent needs An association that is tasked with helping its member organizations to improve their capabilities in certain domains (e.g. quality, environment) and to help members communicate selected capability facts to their customers. In this situation, the members are the partner organizations and the association is the organizing party.

Large organizations often rely on many dozens, hundreds or thousands of partner organizations. Many of an organization's partners can expose the organization to significant risk of damage to brand value, stock value, customer satisfaction, revenue, and stock value. For example, partners can damage an organization through (1) violations of government regulations, laws or the organization's policies; (2) unplanned disruptions to products and services required for production, sales and distribution; and (3) deterioration in the quality or delivery of partner products or services.

First, partner violations of government regulations, laws or the organization's policies can cause an organization's own products to be in violation. For example, a manufacturer may include components from a supplier that has inadequate internal controls leading to:

Use of hazardous, toxic or regulated chemicals

Inaccurate country of origin labeling

Violations of labor laws

Violations of the organization's policies for labor, environment and social responsibility Second, unplanned disruptions to products and services required for production, sales and distribution can cause significant financial hardships and customer satisfaction issues for an organization. For example:

Manufacture of key products may be stopped if a key component is unavailable. Some such outages can be avoided with adequate planning capabilities. For instance, a supplier outage may be caused by a disaster event striking suppliers who prepared poorly for such events. This can result in a large shortfall in revenue and profit for the organization.

Customer satisfaction may drop if an outsourced customer service call center provides poor or inconsistent support experiences for customers A significant revenue and profit shortfall may occur if an outsourced sales call center is suddenly unavailable at the end of a quarter due to an Information Technology (IT) outage and poor planning for alternative procedures.

Third, deterioration in the quality or delivery of partner products or services can cause quality problems in an organization's products and services. For example, a supplier may suffer quality problems for various reasons (e.g. inadequate internal controls of production processes; inadequate procedures to contain contamination by chemical spills). The resulting poor quality components may be integrated into organization products. As a result, the products may significantly under perform or contain dangerous chemicals.

The examples above showed how poorly managed partner capabilities pose significant risks to an organization. On the other end of the spectrum, strengthening partner capabilities can help an organization to compete better. For example:

A business whose partners have sound disaster planning in place when a regional disaster strikes, may be able to gain market share on competitors whose partners were more impacted by the same disaster event An association that is effective in helping its member organizations to improve their capabilities in a domain demonstrates value and is more likely to retain and grow its members.

Organizations with a large number of partners tend to be the most vulnerable to partner risks. The reason is that the more partners there are, the more potential negative events that can inflict damage to an organization's brand value, stock value, customer satisfaction and revenue. Therefore, organizations with many partners take great risk if they manage only their top partners. The capabilities of all partners must be managed since all partners are sources of risk. However, managing the capabilities of all partners is especially difficult for organizations with many dozens, hundreds or thousands of partners.

Organizations generally use one or more of the following approaches to ensure that partners have adequate capabilities:

Mass communication to all partners

Partner data gathering

Personal capability reviews with top partners only

First, organizations use mass communications to inform partners about capability expectations. Mail, email and websites may be used to inform partners that they are expected to have certain capabilities in place, such as the ability to manage their risks and quality effectively and may offer templates, samples and instructions intended to help partners understand the capability objectives. The advantage of mass communication is that it is inexpensive. However, mass communication:

Is ineffective at producing mass improvements. Mass communication only informs the partners. Few improvements are likely without follow-up.

Leaves the organization unaware of risks and partner capabilities since it does not gather data.

Second, organizations may gather data from partner organizations. For example, in one embodiment, an organization uses electronic surveys to get data about current partner capabilities. The main advantage of electronic surveys is that they are inexpensive and configurable. On the other hand, such surveys do not provide a system for managing partner capabilities to achieve capability objectives. They simply help to gather data about current capabilities.

Third, organizations perform personal capability reviews focused on top partners only after gathering data from the top partners. The advantage of personal capability reviews is that they allow an organization to identify and communicate gaps to top partners. The disadvantages are:

Manually intensive review. They are manually intensive and therefore organizations do not have the resources to apply detailed reviews to more than the top partners (e.g. the top 10-50 suppliers in the supply chain or the top channel sales partners).

Manually intensive follow-up. Effective follow-up requires up-to-date records on supplier gap status, supplier contact persons and supplier type. This makes effective follow-up ill-suited to a manual process.

Lack of visibility across partners. For example, to answer a question like which partners have a particular gap, an organization would need to open all the files that all the partners sent. Partners often provide multiple files in response to capability surveys. As a result, an organization with dozens of top partners ends up with hundreds of separate files (or paper documents). This makes it impractical to answer questions across partners.

In sum, a key limitation of using personal capability review to manage partner capabilities is that it is resource intensive. Therefore, an organization with many partners can apply it to top partners only. This means that the vast majority of the partners are still capable of inflicting great damage on an organization by acting outside expected constraints (e.g., by breaking laws on hazardous materials or child labor).

What is needed is system and method that addresses these deficiencies for managing capabilities across many partner organizations.

BRIEF DESCRIPTION OF THE DRAWINGS

FIG. 11, Domain Metrics Example, provides one example of defining Partner organization metrics for several domains. This illustrates the Gather organizational input task within the "MEASURE" step (FIG. 4);

FIGS. 12a and 12b, Sample Survey Fields for a Few Domains, provides an example of a subset of survey data requirements for several domains. This illustrates an output of the "Define campaign requirements" task within the "Plan Campaign" task (FIG. 9);

FIG. 13 Capability Review Guideline (example) shows a portion of one embodiment of a document that a reviewer uses as a checklist to perform a partner capability review for the Business Continuity domain. Another embodiment could be used for another organization for Business Continuity. Another embodiment would be used for a different domain FIG. 14 is an example of an Entity Relationship Diagram that illustrates the content and structure of one embodiment of data storage for a System to Manage Partners;

FIGS. 15a-15f list the business rules for the same embodiment as FIG. 14; and

FIG. 16 is an example of one embodiment of an Entity Relationship Diagram that shows the content and structure of a Data Warehouse for reporting FIG. 14 data FIG. 17 Comparison of PCI vs. DMAIC-Six Sigma FIG. 18 summarizes the use sequence for a System for Managing Partners

DESCRIPTION OF THE INVENTION

Figure 1:
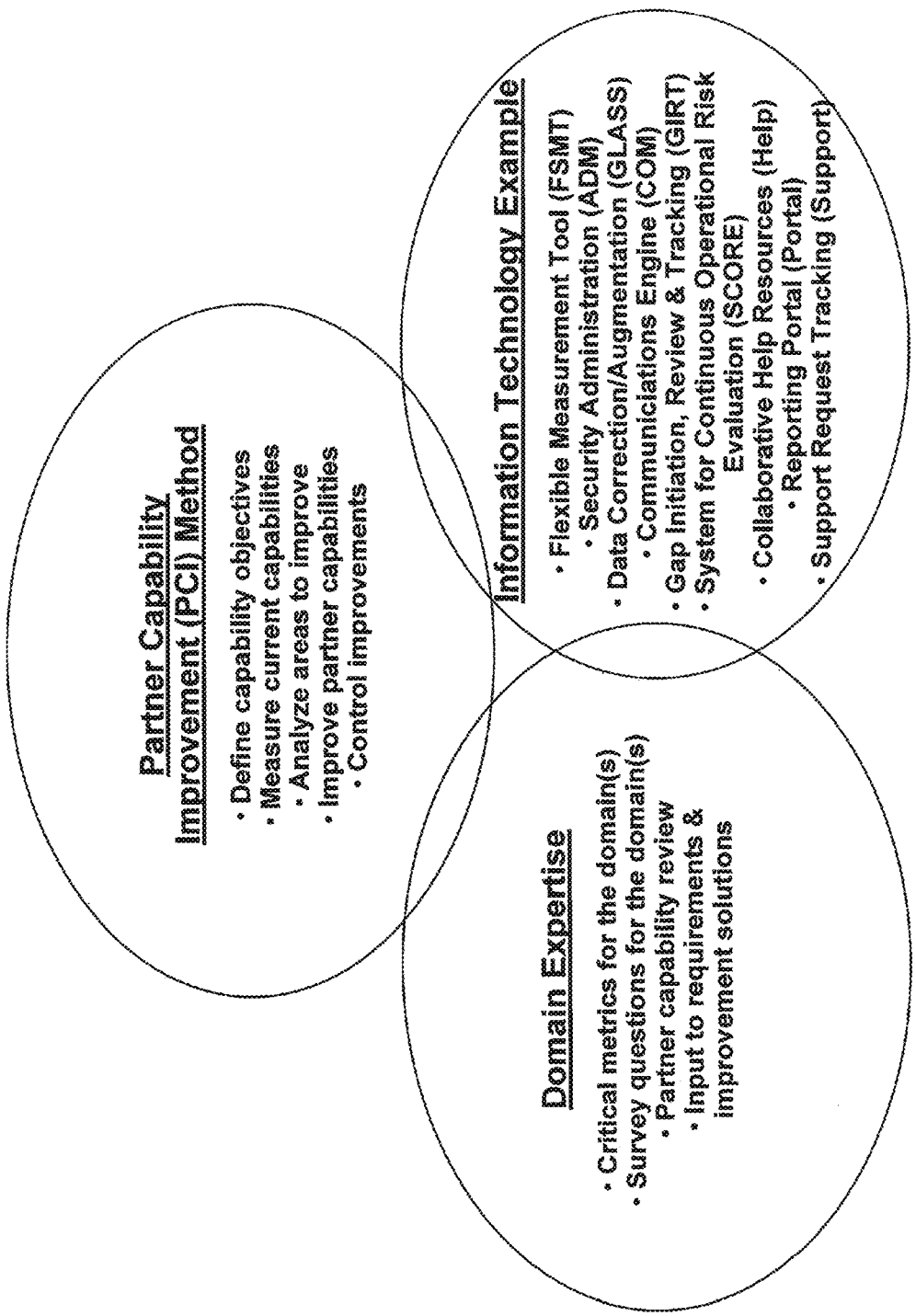
FIG. 1 illustrates three disciplines to improve partner capabilities (System 100)

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Standards enable an organization to determine the extent to which the organization's capabilities meet generally accepted capability objectives. An organization compares its capabilities against hundreds of detailed capabilities described in a standard, identifies its capability gaps and puts in place an effort to improve its capabilities to meet the standard. As such, standards are a valuable resource in helping an organization to improve its internal capabilities in many domains.

An organization that relies on many partner organizations to carry out its mission must ensure that partners have sound capabilities in place in multiple domains. If not, the organization may be hindered or prevented from achieving its goals.

Standards could be a valuable resource for ensuring that an organization's partners have comprehensive capabilities in place. The problem is that until the system described by the present invention, there was no effective way for an organization to manage all of its many dozens, hundreds or thousands of partners to achieve the hundreds of capabilities described by comprehensive standards in one or more domains.

For example, say a manufacturing corporation XYZ has 4000 manufacturing suppliers and wants to ensure that they have sound management programs in place for Environmental Impact Reduction; Health and Safety; and Business Continuity Management (BCM). XYZ wants to use the following standards to gauge its suppliers:

ISO 14001 Environment

ISO 18001 Health and Safety

British Standard 25999 for Business Continuity Management (BCM) In addition to the requirements described by the standards, XYZ has additional objectives in each area for the suppliers. All together, XYZ has approximately 100 supplier manufacturing site capabilities across the three areas. There are three manufacturing sites per supplier on average. FIG. 17 illustrates the limits of DMAIC-Six Sigma approaches to managing capability versus the use of PCI in the current invention.

It is clear that XYZ requires a system in order to cover the capabilities of all suppliers. In the example, XYZ has 1.2 million capabilities to manage (i.e. 4000 suppliers*3 sites per supplier*100 site capabilities each). In addition, any of these capabilities can change at any supplier at any time, especially during and partner capability improvement project. Keeping up with this quantity and volatility of data would be impossible without a centralized database and specialized software that suppliers can access themselves.

In the past, this data complexity led organizations to focus just on their top partners. For example, without a system according the current invention, XYZ selects its top 50 suppliers and rationalizes that it is managing about half of its manufacturing spend in dollars. There are severe risks to this approach. Essentially, the risk boils down to the fact that the other 3950 suppliers can inflict great damage to XYZ's revenue and brand yet XYZ is doing little to control this risk. For example:

- The other 3950 suppliers could include some big polluters. Therefore, XYZ would have no idea the overall environmental impact for its supply chain is getting better or worse
- The other 3950 suppliers could include companies with egregious health and safety history. A newspaper article on XYZ's use of such suppliers could adversely affect its brand
- A disaster that impacts unprepared suppliers among the other 3950 companies could halt production of key XYZ products. After all, XYZ cannot ship a product that is missing even a single component. Since many components are manufactured in economically advantaged zones, a regional disaster event could affect many suppliers.

In the past, XYZ would have to take the significant risk of managing the top 50 suppliers, leaving the other 3950 unmanaged and hoping for the best.

In contrast, a system according to the present invention enables an organization to manage an unlimited number of partners to achieve objectives for one or more domains. XYZ could use a system according to the present invention to measure and improve capabilities at its 4000 suppliers, thereby managing more of its risks. XYZ could define capability objectives based on generally accepted standards and could add other objectives important to XYZ's industry but not specifically called out by the standard.

FIG. 18 illustrates one embodiment in which a system according to the present invention manages partner capabilities without constant attention:

- Measuring partner capabilities
- Identifying partner gaps versus objectives
- Informing partners about their:
  - gaps and gap recommendations;
  - aids in closing the gaps (e.g. references to a standard; templates, instructions;
  - capability ratings/scores (e.g. overall risk, environmental impact)
- Following up with each partner
- Tracking progress and communications until the partners reach the organization's objectives
- Ensuring that improvements are retained through periodic updates
- Providing the organization with visibility across all partners and all capabilities at all times.

FIG. 1 illustrates that Information Technology according to the present invention combines with the Partner Capability Improvement (PCI) method (illustrated in FIGS. 2 through 10) and domain expertise (in one or more domains) to enable organizations with many partners to manage all of them effectively.

As noted above, current approaches that focus on top partners leave an organization with a large number of partners at risk because they do not manage the capabilities of the majority of partners.

A system according to the present invention measures the current capabilities of partners (for any set of capabilities and partners chosen by the organization) and then manages improvements in partner capabilities from the current state to the organization's objectives in one or more domains. It can be applied by large and small organizations. It can be applied to any number of partners but is particularly valuable for organizations with a large number of partners.

In one embodiment, the organization configures objectives for a domain in the system based on its own requirements. In another, the organization uses generally accepted standards (e.g. ISO 14001, ISO 18001, BS 25999, etc.). In one embodiment, the organization bases the objectives on a combination of standards and internally developed objectives.

FIG. 1 illustrates a partner management System 100. System 100 uses three disciplines to improve partner capabilities. As a result, the new approach enables organizations to manage large numbers of partners. The three disciplines are the Partner Capability Improvement (PCI) Method, Domain expertise and specialized Information Technology.

First, Partner Capability Improvement (PCI) is the step-by-step method for managing many capabilities in one or more domains across many external partner organizations.

- "DEFINE": Determine capability objectives for partners and input into System
- "MEASURE": Interact with partners to gather their current capabilities. Also correct & augment data. Unlike Six Sigma, PCI integrates Information Technology, domain-specific input and market research campaign techniques to scale this step to many partners.
- "ASSESS": Automatically assess gaps and make recommendations
- "IMPROVE": Follow-up, track and offer self-help aids to close gaps. PCI integrates Information Technology automation, domain-specific input and market research campaign techniques to scale this step to many partners.
- "CONTROL": Periodically ask partners for updates. Plan for continuous improvement PCI shares the same top-level step names as DMAIC (a Six Sigma methodology, see www.isixsigma.com). Other than that superficial resemblance, the tasks within PCI versus DMAIC are very different since the two methodologies have such different objectives. A quick summary of the differences includes the following (see FIG. 17 for additional differences):

- A DMAIC project focuses on decreasing variations in outcomes from a single internal process within an organization
- A PCI project focuses on increasing many capabilities at many external partner organizations.
- DMAIC uses various statistical techniques to find the few most critical sources of internal process variation.
- For PCI, statistical analysis is not important
- DMAIC does not require software other than statistical calculators.
- PCI absolutely requires software automation to interact with partner organizations and to manage many capabilities across the many partners.

Second, domain experts (e.g. Environment, Social Responsibility, Business Continuity) provide input into PCI and into tailoring Information Technology. In one embodiment, domain experts provide input into:
- Critical metrics for the domain
- Survey questions for the domain
- Training materials, self-help documentation and templates to aid partners to make improvements to accomplish the organization's objectives for the domain In one embodiment, system 100 combines domain expert input into the Information Technology with domain expert support and review of a subset of partners.
- Second-level support and facilitation to help partners to complete surveys and to understand ways to implement new capability objectives set by the organization
- Detailed review of the responses of some partners (e.g. top partners or a rotating list of partners) in order to identify qualitative gaps that may not be evident from automated validation alone. For example, domain experts review and score a partner's written procedures for controlling a specific risk. Such reviews are conducted more effectively using the System since communications and tracking are automated.

Note, as can be seen in FIG. 17, in DMAIC, a domain expert called a DMAIC Blackbelt provides domain input on the DMAIC methodology. In PCI, the domain experts are people who are experts in the domain for which capabilities will be improved (e.g. Environmental Impact, Business Continuity).

Third, a system according to the present invention requires Information Technology. FIG. 18 provides a high-level summary of a use sequence and some key aspects of one embodiment of the Information Technology for the System to Manage Partners. Information Technology will be discussed in detail later in this document, One aspect of the present invention is that Domain Expert inputs into PCI and Information Technology are isolated so that PCI and Information Technology may be reused for many domains. While the Domain Expert input is used to tailor the configuration to an individual domain, the foundation of the PCI method and Information Technology remain the same.

The primary advantage of a system according to the current invention is that for the first time an organization with many partners can manage many capabilities (in one or more domains) across all its partners, not just its top partners. The result is significantly less risk and a more competitive organization.

Other important advantages include:
- Domain Flexibility—Domain inputs are isolated so that the PCI methodology and specialized Information Technology adapt to different domains.
- Less Effort—Makes it possible to leverage relatively fewer domain experts, who are often in short supply, over a large number of partners. Domain expertise is leveraged through their inputs into the Information Technology and by supporting partners using a combination of lower-skilled agents to work in first-level support while saving the domain experts for tasks like second-level support and individual partner review. In addition, the systematic approach ensures consistency across partners and years as opposed to a manual approach which is necessarily person-dependent.
- Collaboration—Takes advantage of collaboration between partners in order to harvest collective intelligence (e.g. for identifying risks, for benchmarking, to share best practices anonymously) for the organization and to maximize the extent to which partners help each other.
- Better Data Quality—Data consistency is improved thanks to systematic validation and a common data store. In addition, PCI tasks for improving data quality include:
  - Data correction (e.g. wrong country chosen for city)
  - Data augmentation (e.g. importing third party data)
  - Support resources to answer partner questions.
- Better Data Visibility—central database with common data structure enables summing of data across partners (e.g. which partners are lacking capability X). In addition, a central database facilitates data export to other applications. Also, a central database enables allows analysis and improvements that are just not possible using separate files or paper. For example, suppliers often share the same subcontractor or use the same critical services provider. A disruption at such a shared resource can disrupt many partners. PCI includes a method to identify such situations (in the Measure step) even though suppliers enter subcontractor names and addresses differently. This allows the organization to reduce risks further by considering shared resource risk in partner solutions (Improve step).

In one embodiment, system 100 includes the Partner Capability Improvement (PCI) Method, the isolation of Domain Expert inputs (i.e. so that PCI and the Information Technology are not limited to any one domain or even a small set of domains), and Specialized Information Technology. System 100 integrates these three components to provide a system and method to improve capability across all partner organizations.

Partner Capability Improvement (PCI) Method

PCI and DMAIC (Six Sigma) are completely different methodologies aimed at different purposes. As described in FIG. 17, DMAIC (Six Sigma) focuses on in-depth, manual statistical analysis that cause variations in a single internal process. The manual analysis, internal focus and one process at a time approach make it ill suited to the task of managing many thousands or even millions of capabilities across partner organizations.

In contract, the following aspects of the PCI method make it ideally suited to the task of scaling an improvement regimen across an unlimited number of partners:
- Isolating Domain Expert inputs so that PCI can be tailored to different domains
- Integrating Information Technology, market research and technical support processes in order to scale PCI efficiently across a large number of external organizations (e.g. see "Plan Campaign" and "Execute Campaign" pages called from the "MEASURE" and "IMPROVE" steps.
- Integrating electronic-training techniques in order to efficiently train large numbers of external organizations. Examples include self-help documentation (e.g. templates, instructions, best practices, examples), partner collaboration technologies (e.g. wiki, forums, knowledge database search), interactive quizzes, software automation (e.g. Business Continuity software to help partners assess risks and create plans for emergency management, recovery and restoration)
- Introducing a capability review process. Since DMAIC focuses on internal processes, review of the completeness and accuracy of data is not usually a primary concern. External partner organizations may have goals that conflict with the provision of complete and accurate data. Therefore, the PCI Measure step adds a review task to ensure that partner data and documents are complete, current and accurate. This review task may be applied to all partners, a subset of partners or none, according to organization objectives and resources.

Integrating data improvement techniques including data correction, data standardization, data validation and data augmentation; data management techniques such as partner organization merge/split/add/delete.

Cross-partner visibility—partner responses are stored in a central database (e.g. transaction database and/or data warehouse) for project management, partner scoring and progress tracking and analytical reporting (e.g. benchmarks, dashboards, ad hoc analysis, statistical analysis, data mining and reporting).

Partner Capability Improvement (PCI) is the step-by-step method for managing many capabilities in one or more domains across many external partner organizations.

"DEFINE": Determine capability objectives for partners and input into System

"MEASURE": Interact with partners to gather their current capabilities. Also correct & augment data. Unlike Six Sigma, PCI integrates Information Technology, domain-specific input and market research campaign techniques to scale this step to many partners.

"ASSESS": Automatically assess gaps and make recommendations

"IMPROVE": Follow-up, track and offer self-help aids to close gaps. PCI integrates Information Technology automation, domain-specific input and market research campaign techniques to scale this step to many partners.

Figure 2:
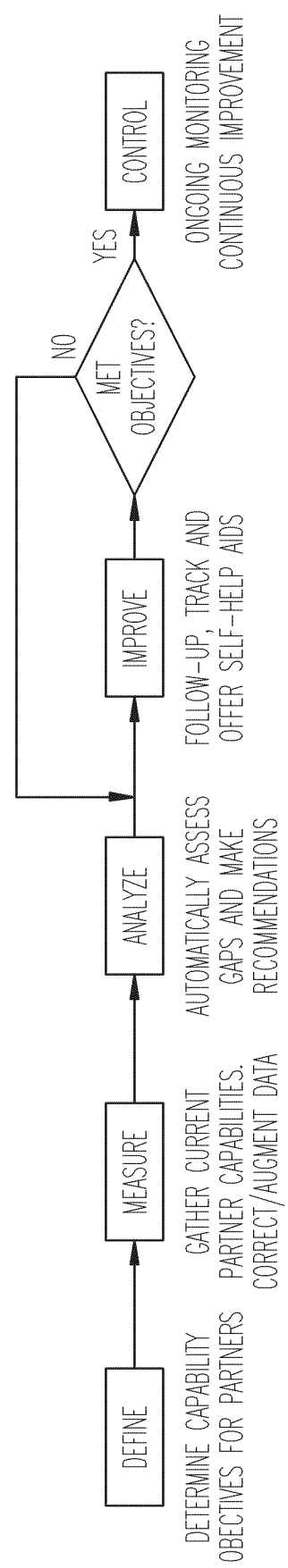
FIG. 2 shows the Top-Level Steps in the Partner Capability Improvement (PCI) Method.

"CONTROL": Periodically ask partners for updates. Plan for continuous improvement FIGS. 2 through 9 depict the workflow of the PCI methodology. FIG. 2 shows the top-level steps in the PCI methodology and includes the objective of each step. Note that the Improve step is iterative—it repeats until the partners achieve the capability objectives set by the organization.

The "DEFINE" Step

Figure 3:
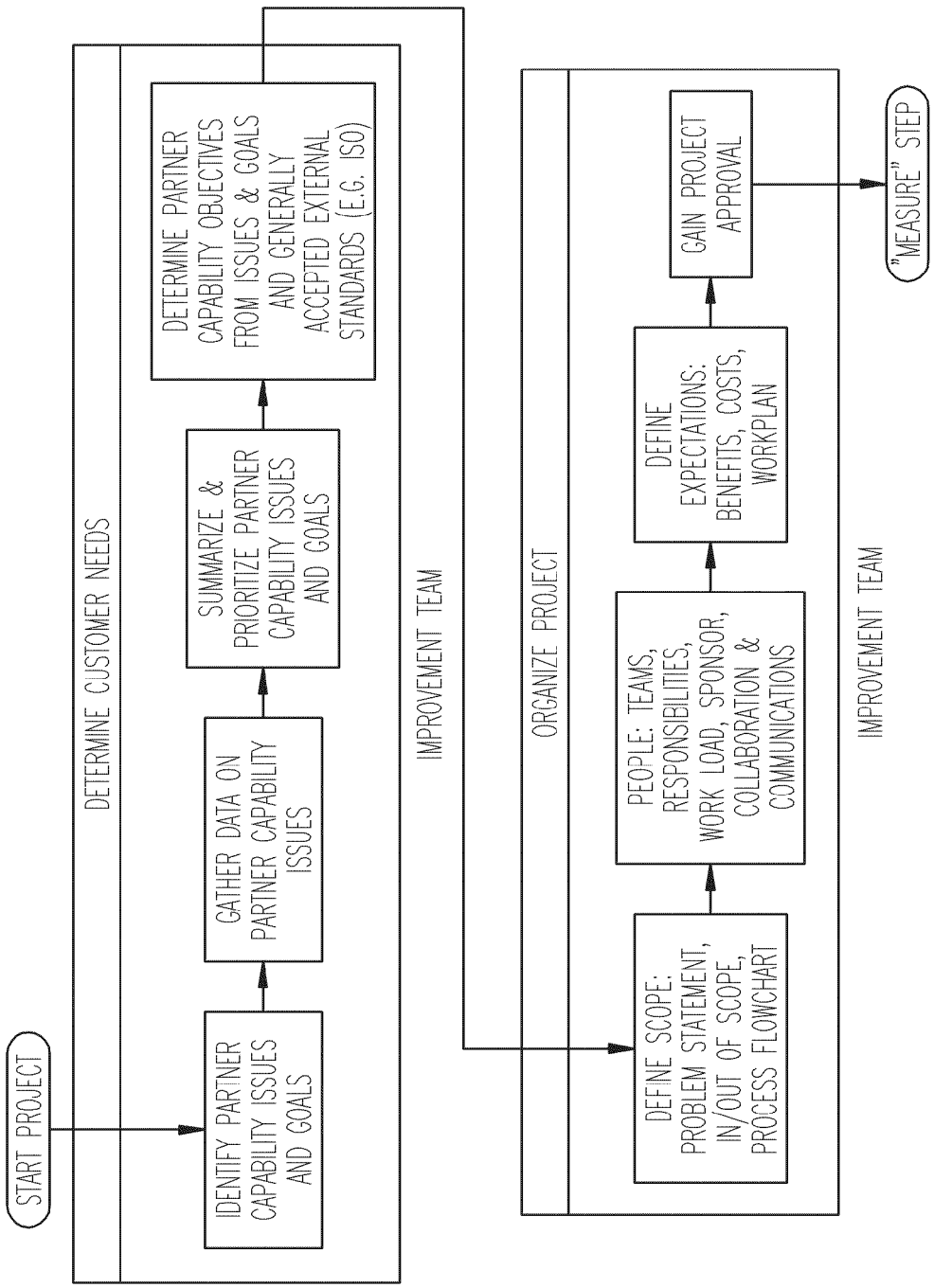
FIG. 3 illustrates the tasks in the "Define" step of the PCI method.

FIG. 3 illustrates the "DEFINE" step which identifies specific partner capabilities objectives based on external standards (e.g. ISO) and management goals. The "Determine customer needs" task is crucial because the rest of the steps in PCI are oriented to achieving the objectives identified in this task.

In one embodiment, a single person works alone to complete the "DEFINE" step. The single person decides to perform the four subtasks in the "Determine customer needs" task. In this embodiment, few people from the organization will be part of the project so the person skips the "Organize project" steps.

In another embodiment, the single person needs to report the status to management and needs a concise description of the effort. So he or she adds "Define scope" and "Define expectations, benefits, costs and workplan" to "Determine customer needs".

In another embodiment, a large effort is organized to make a significant improvement across thousands of partner organizations (e.g. a supply chain or sales/distribution channels or organizations that assist a governmental organization). In this embodiment, all the tasks in the "DEFINE" step are followed by a multi-person team.

The "MEASURE" Step

Figure 4:
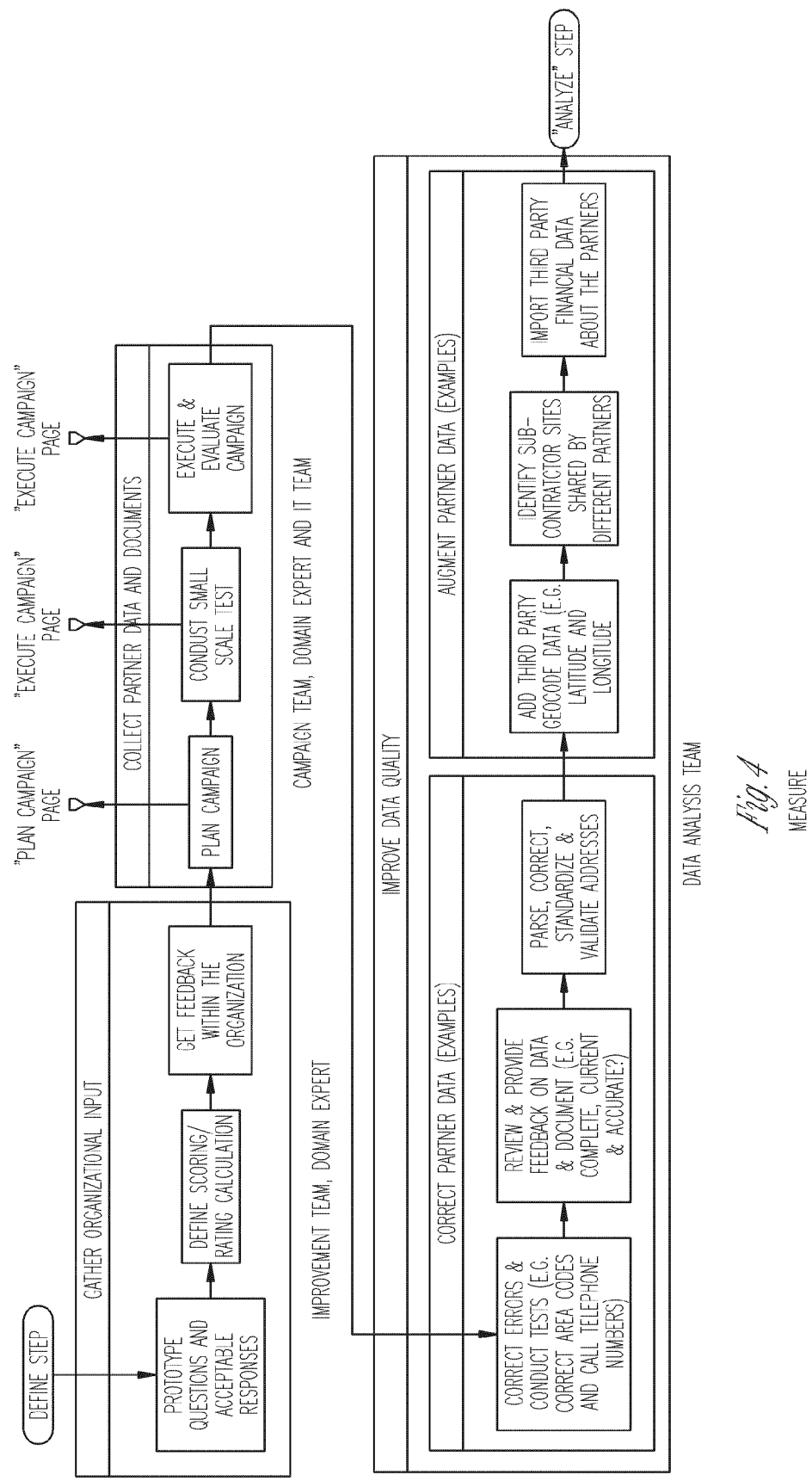
FIG. 4 illustrates the tasks in the "Measure" step of the PCI method.

FIG. 4 depicts the "MEASURE" step which gathers the current capabilities for the organization's partners. The most important tasks are "Gather organizational input", "Collect Partner Data and Documents" and "Get feedback within the organization". One embodiment might include only these three tasks and subtasks. Note that the key metrics vary a great deal from one domain to another. Therefore, the "Gather organizational input" subtask often benefits from incorporating knowledge of the domain. In some embodiments, a domain expert provides input into which objectives are most important for the organization's situation and domain.

It should be noted that the "Collect Partner Data and Documents" task has subtasks that may be left in or out depending on the situation, as will be explained further below.

In addition to the most important tasks, namely "Gather organizational input", "Collect Partner Data and Documents" and "Get feedback within the organization", other tasks may be important for particular situations. For example, one embodiment, where emergency contact information is important, may add the "Correct telephone number and job title" subtask. For another embodiment, quick emergency contact is vital, so the "Test telephone numbers" subtask is added in order to correct any errors that partners made in entering their telephone numbers. In one embodiment, telephone numbers are tested by calling them. In some cases, the partner may need to be contacted again to get correct information (contacting the partner again is not show here in order to simplify the diagram).

In one embodiment, where accurate partner location information is important, the "Parse, correct, standardize & validate addresses" subtask is used. Addresses may be standardized manually or by testing them against global address database services or software. In another embodiment, mapping partner locations is important, so the "Add third party geocode data" subtask is executed.

In another embodiment, the organization may be at risk of disruptions in materials, services or components supplied to its partners (i.e. it partner's supply chain). For instance, the organization may suspect that many partners outsource to the same subcontractor or receive materials or components from a shared supplier's supplier or use the same key critical service provider. A disruption at a shared resource can disrupt many partners. However such shared resources are not apparent from surveys since every survey is independent and confidential. Therefore, the Data Analysis Team may be assigned to the sub-task "Identify sites shared by different partners".

Another embodiment, for instance in the Business Continuity domain where partner viability important, adds the "Import third party financial data" subtask and apply it to some or all of the partners. There are many potential sources for financial data for both public and private companies (e.g. credit card bureaus, rating agencies such as Moody's, Dun and Bradstreet). Each service has detailed documentation for what data they offer and how to import it. It can be as simple as importing just an overall score for a partner or it can include other information such as late payments, which can be a leading indicator of bankruptcy. In one embodiment, financial questions are added to the survey itself. The Analysis step incorporates quantitative bankruptcy models (e.g. Altman Z, Robert Altman, 1968, 2000) based on the financial questions. In another embodiment, qualitative questions (e.g. has your organization announced layoffs of over X % of your labor force in the past year?) combine with automated business rules in a bankruptcy prediction model. In another embodiment, a bankruptcy prediction model produces a prediction and risk rating/score by integrating quantitative and qualitative questions.

As noted above, the "Collect Partner Data and Documents" task has subtasks that may be left in or out depending on the organization's situation. In one embodiment, an organization with many hundreds or many thousands of partners may need to use all the subtasks in order to efficiently reach so many partners. The "Collect Partner Data and Documents" task provides the option to integrate mass market research techniques in order for the process to scale to many hundreds or many thousands of partner organizations.

In other embodiments, only a few of the subtasks are used. For example, within the "Plan Campaign" task shown in FIG. 9, one embodiment for a smaller effort may include only the following steps:

"Define partner requests (e.g. provide survey data, address capability gaps)". For the "MEASURE" step, survey data is a common requirement in many embodiments "Tailor application (e.g. survey questions, gaps/objectives)" ("MEASURE" step). In some embodiments, a professional survey designer is engaged since the formulation of survey questions greatly influences responses. As a result, a professional survey designed may increase survey quality. In another embodiment, survey questions are developed by knowledgeable but not expert people. In another embodiment, survey questions are based on a published list of questions from an external organization such as a standards organization.

"Finalize list of Partners, Partner contacts, etc." and

"Determine communication events, templates and recipients".

In one embodiment, one may add the IT Team subtasks if there will be advanced automation and a large team. Another embodiment may include the "Define adaptive data requirements" subtask if it is believed that partner characteristics such as industry classification, size, operations performed, etc. have a significant affect on addressing issues defined in the "DEFINE" step.

Figure 8:
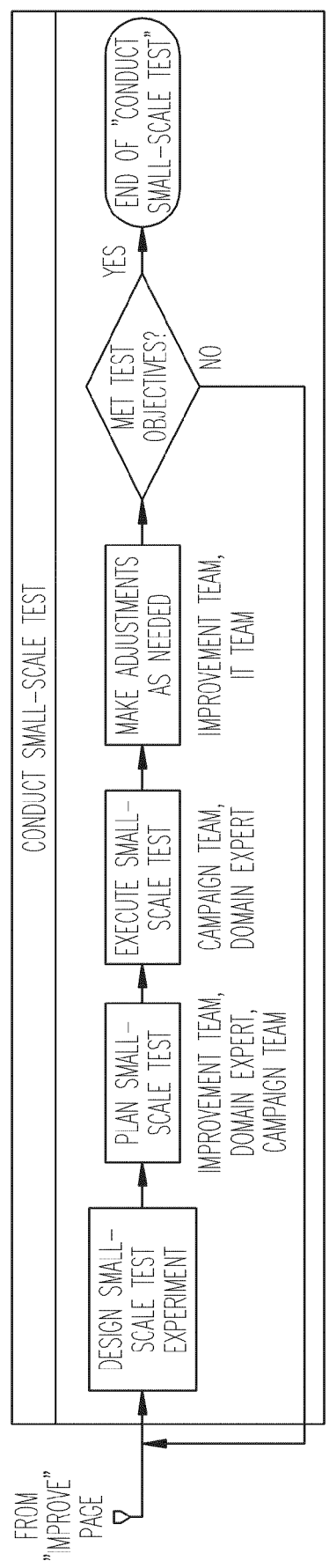
FIG. 8 illustrates the sub-tasks in the "Conduct Small-Scale Test" task. The "Conduct Small-Scale Test" task is referenced in the "Improve" step of the PCI method.

In another embodiment, the team adds "Conduct small-scale test" before "Execute Campaign" in order to gather partner feedback from a small set of partners. This is particularly important if solution implementation could be costly. Note: the FIG. 8 depicts the "Conduct small-scale test" workflow.

Figure 10:
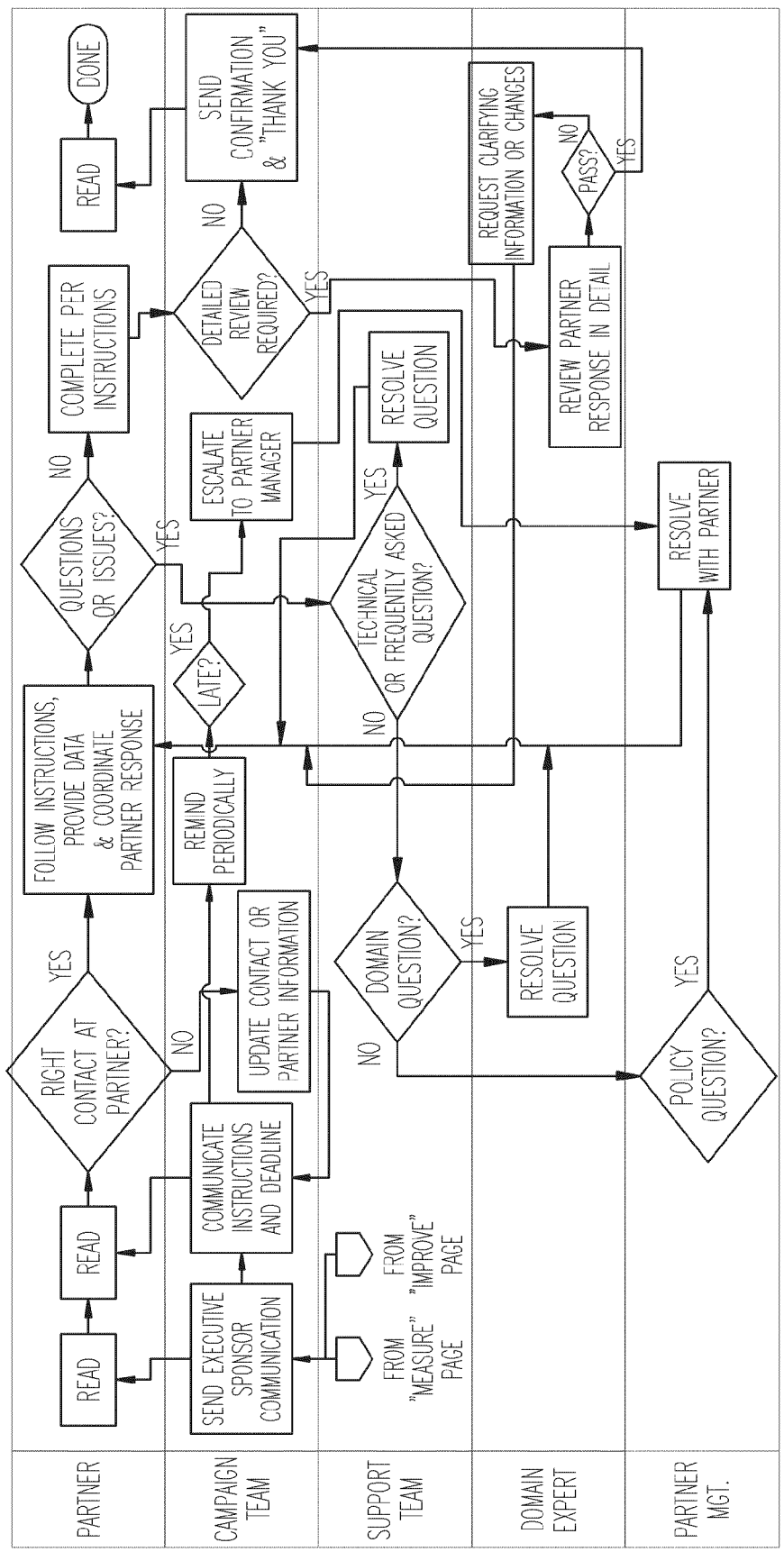
FIG. 10 illustrates the sub-tasks in the "Execute Campaign" task. The "Execute Campaign" task is referenced in the "Measure" step and in the "Improve" step of the PCI method.

In one embodiment, the "Execute Campaign" task shown in FIG. 10 is adjusted to the organization's and partner organizations' situation. One embodiment for a small effort may include only the following steps:

Campaign Team: "Communicate instructions and deadline", "Update contact or Partner information", "Remind periodically"

Partner: "Read", "Follow instructions", "Complete per instructions"

Support Team: "Resolve question"

In one embodiment for a small effort, the "Campaign Team", "Support Team" and "Data Analysis Team" may be a single person, part-time, with no separate Domain Expert or Partner Management resources.

Another embodiment may include the "Resolve with Partner" subtask which involves the Partner Management/Purchasing group to contribute additional persuasion to partners who do not initially comply with the request to provide the required information. Non-compliant partners are escalated to the responsible manager in the Partner Management/Purchasing group, who then engages with the partner to ensure that the partner provides the requested information, in some cases with a postponed deadline.

In another embodiment, there is a detailed review of the most important partners in order to have greater assurance that the data that they provided is complete and accurate. This detailed review includes the "Review Partner response in detail" and "Request clarifying information or changes" subtasks. In another embodiment, the review takes place on one set of partners in one execution of the PCI steps and other sets of partners in subsequent execution of the PCI steps, in order to cover more or all partners over time. In one embodiment, a separate Domain Expert performs these subtasks. In another embodiment, a single person at the organization acts in the Campaign Team, Support Team and Domain Expert roles.

In another embodiment, where the organization seeks to achieve a high rate of compliance with a large set of partners, multiple people may be needed on each team and all the subtasks may be needed.

The "ANALYZE" Step

Figure 5:
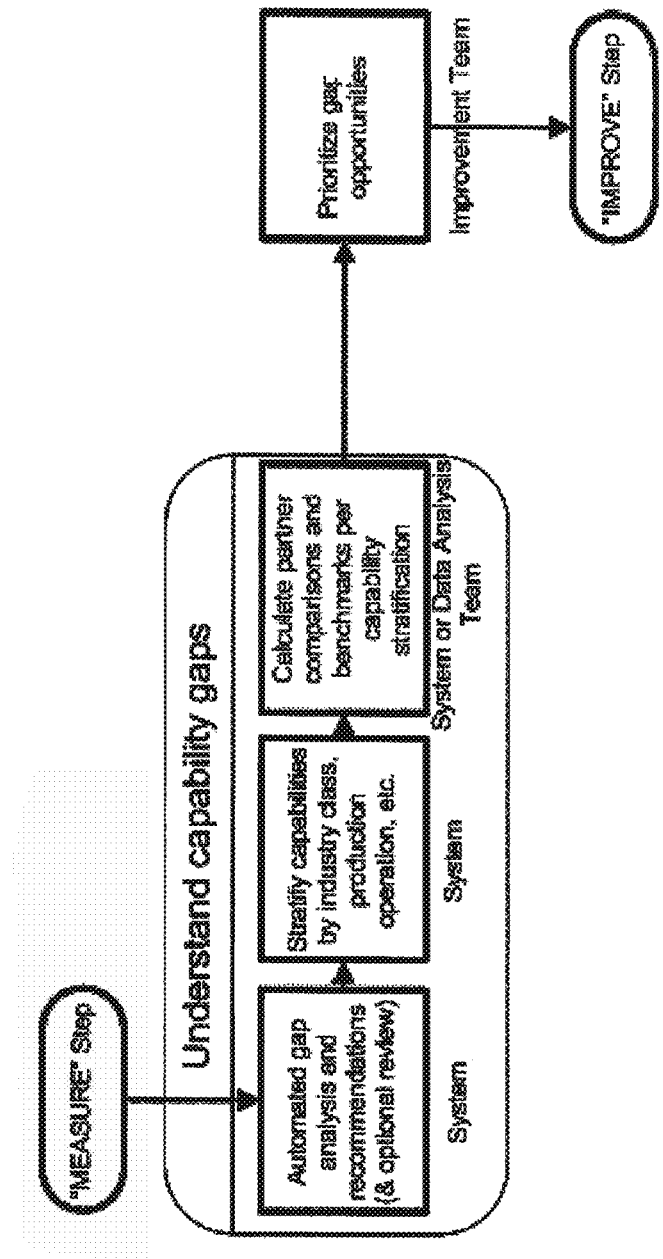
FIG. 5 illustrates the tasks in the "Analyze" step of the PCI method.

FIG. 5 illustrates the "ANALYSIS" step which seeks to understand and prioritize partner gaps (i.e. the difference between the desired capability objective and the partner's actual capability).

In a simple embodiment, there is a clear objective (or more than one) to apply across all partners, for example, to support new regulations, laws or organizational policy. In this embodiment, the sub-task "Automated gap analysis and recommendations (& optional review)" may be the only sub-task needed.

In more common embodiments, the "Stratify capabilities by industry class, production operation, etc." sub-task is added because it is believed that the current capability may vary significantly by such partner characteristics. Also, the related "Calculate partner comparisons and benchmarks per capability stratification" task is added. In another embodiment, there are multiple potential significant changes to effect in the partners so the sub-task "Prioritize gaps & opportunities" is added in order to focus resources on the most important opportunities.

The "IMPROVE" Step

Figure 6:
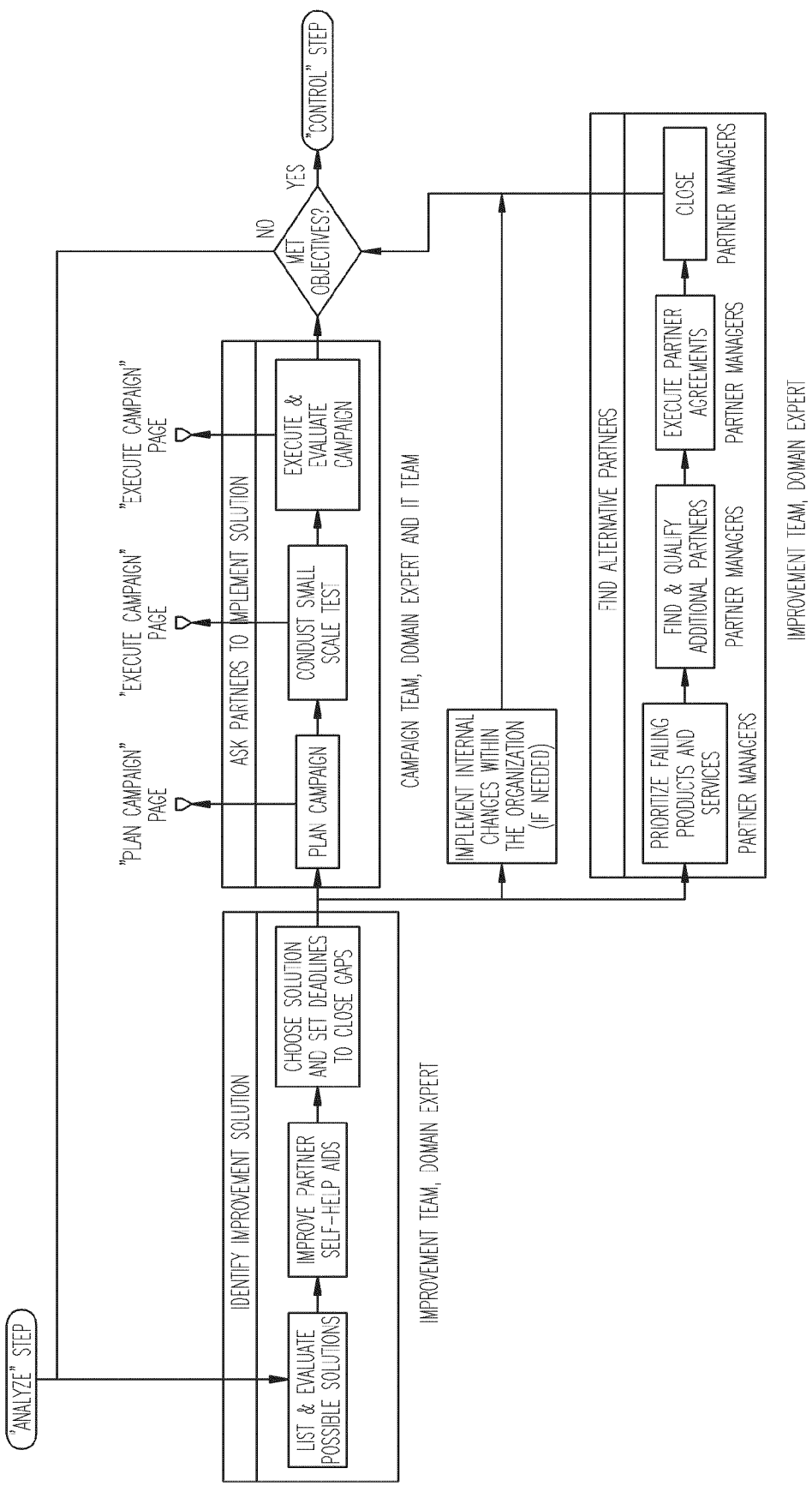
FIG. 6 illustrates the tasks in the "Improve" step of the PCI method.

FIG. 6 depicts the "IMPROVE" step. It is the most important PCI step because it is the step that adds real value by addressing the issues and goals identified in the "DEFINE" step by measurably increasing partner capabilities.

One embodiment includes only the following critical subtasks:

"Choose solution and set deadlines to close gaps"

"Plan campaign"

"Execute campaign"

The "Met objectives?" decision point which iterates the "IMPROVE" step until objectives are met Even though the "Plan campaign" and "Execute campaign" workflow tasks are the same in the "IMPROVE" and "MEASURE" steps, the campaign content and effect are markedly different. In the "IMPROVE" step, the campaign content consists of communicating each partner's gaps versus objectives and following up with each partner until the gaps are closed. The effect of the "IMPROVE" step is to increase partner capabilities to reach a certain measurable objective.

In one embodiment, the solution to the customer issues is obvious, so the ""Choose solution and set deadlines to close gaps" subtask may be the only subtask needed within the "Identify improvement solution" task. In another embodiment, the best solution may not be obvious, so the task "List & evaluate possible solutions" is added.

In a large PCI effort, many people may have some input into the solution. In such a case, the Improvement Team and the Domain Expert are often primarily responsible for these steps, with review and feedback from Partner Management, Campaign Team, Data Analysis Team, executives and the IT Team. In contrast, a small effort may have one part-time person making the solution decision, usually with input from management.

In another embodiment, internal changes may be needed to facilitate increased partner capabilities. For example, an objective may be to reduce the time needed to recover production at an alternate site in case the current production site for the partner is badly damaged by a disaster event. If it takes several weeks or months for the organization to test and certify an alternate manufacturing site for a partner of complex components then an accelerated process may me created at the organization in case of disaster events.

In another embodiment, "Ask partners to implement solution" is combined with "Finding alternative partners" for those partners who do not meet objectives, especially for critical components, materials and services.

As noted above, the "Plan Campaign" page and "Execute Campaign" tasks are called from the Improve step as well as the Measure step. Some subtasks within "Plan Campaign" and "Execute Campaign" may be left in or out of the "IMPROVE" step depending on the organization's situation. In one embodiment, an organization with many hundreds or many thousands of partners may need to use all the subtasks in order to efficiently reach so many partners, communicate each partner's gaps and follow up with each partner until objectives are reached. The "Plan Campaign" and "Execute Campaign" tasks and subtasks provide the option to integrate mass market research techniques in order for the process to scale efficiently to many hundreds or many thousands of partner organizations.

In other embodiments, only a few of the subtasks are used. For example, within the "Plan Campaign" task shown in FIG. 9, one embodiment for a smaller effort may include only the following steps:
- "Define Partner requests (e.g. provide survey data, address capability gaps)". For the "IMPROVE" step, address capability gaps is the most common requirement
- "Tailor application (e.g. survey questions, gaps/objectives) ". For the "IMPROVE" step, having a vehicle for tailoring gaps/objectives per different categories of partners is a common embodiment
- "Finalize list of partners, partner contacts, etc." and
- "Determine communication events, templates and recipients".

In one embodiment, system 100 adds the IT Team subtasks if there will be advanced automation. In one embodiment, system 100 includes the "Define adaptive data requirements" subtask if the "ANALYSIS" step proved that partner characteristics such as industry classification, manufacturing operations performed, etc. have a significant affect on addressing issues defined in the "DEFINE" step.

The "Execute Campaign" task shown in FIG. 10 should also be adjusted in the Improve step per the organization's and partners' situation. One embodiment for a small effort may include only the following steps:
Campaign Team: "Communicate instructions and deadline", "Remind periodically"
Partner: "Read", "Follow instructions", "Complete per instructions"
Support Team: "Resolve question"

In one embodiment for a smaller effort, the "Campaign Team", "Support Team" and "Data Analysis Team" may be a single person, part-time, with no separate Domain Expert or Partner Management resources.

In one embodiment, system 100 includes the "Resolve with Partner" subtask which involves the Partner Management/Purchasing group to contribute additional persuasion to partners who do not initially comply with the request to close gaps with the capability objective. Non-compliant partners are escalated to the responsible manager in the Partner Management/Purchasing group who then engages with the partner to ensure that the increased capability objective is reached, in some cases with a postponed deadline.

In one embodiment, system 100 implements a detailed review of the most important partners in order to have greater confidence that the most crucial partners have the capability that they state that they have. This detailed review includes the "Review Partner response in detail" and "Request clarifying information or changes" subtasks. In one variation of this embodiment, a separate Domain Expert performs these subtasks. In another variation, a single person acts as the Campaign Team, Support Team and Domain Expert.

In another embodiment, where the organization seeks to achieve a high rate of compliance with a large set of partners, multiple people may be needed on each team and all the subtasks may be needed.

The "CONTROL" Step

Figure 7:
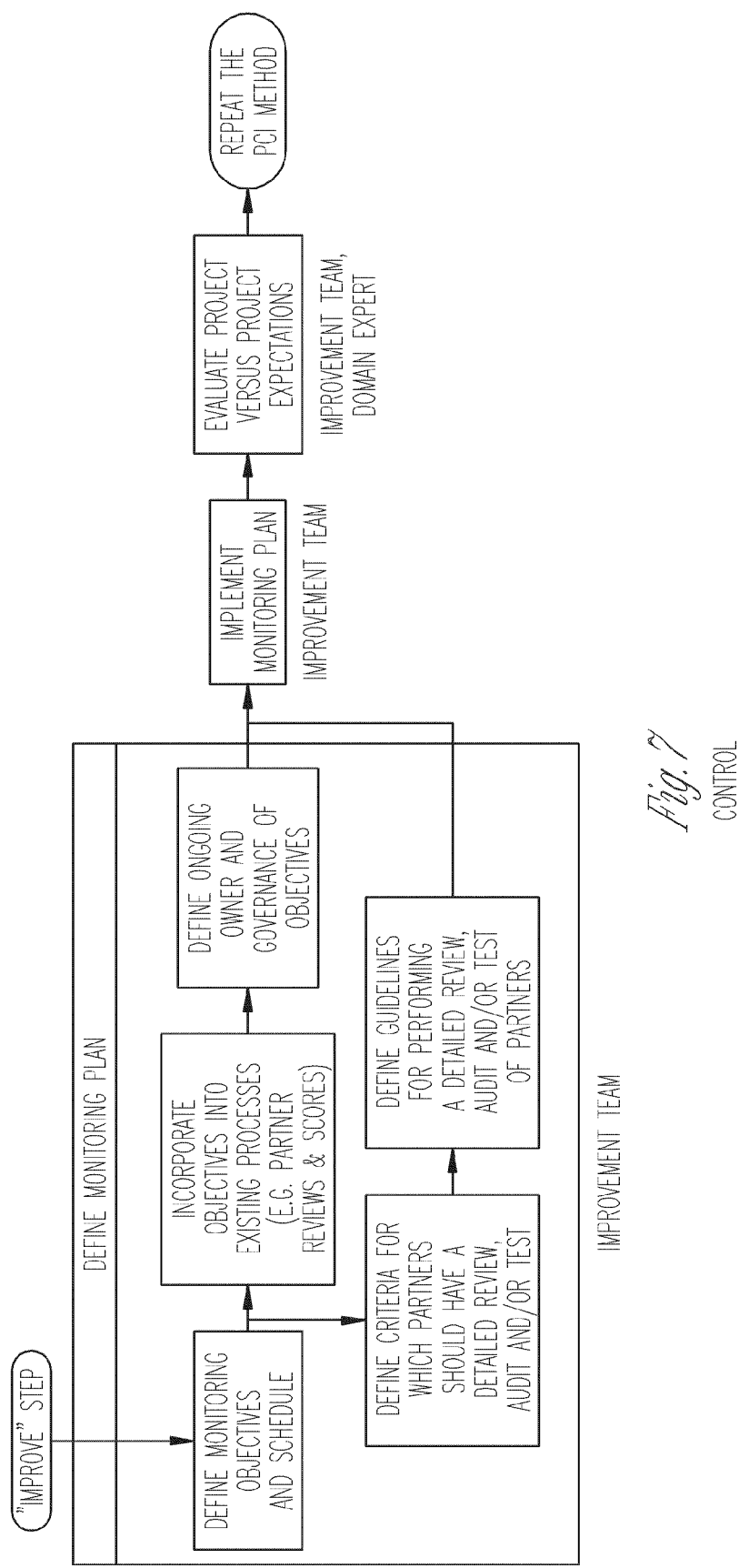
FIG. 7 illustrates the tasks in the "Control" step of the PCI method.

FIG. 7 depicts the "CONTROL" step which contains the tasks that institutionalize partner improvements and plan further improvements in order to ensure that the partner organizations continue to meet objectives on an ongoing basis.

Partner organizations should be monitored periodically to ensure that objectives continue to be met. In one embodiment, this is done annually for all partners and quarterly for the most important partners. In one embodiment, system 100 implements annual monitoring for all partners with a brief follow up semi-annually or quarterly with all partners. In one embodiment, system 100 differentiates between different types of partners and determines which partners are monitored during different months in order to smooth the workload or take advantage of seasonal fluctuations in the organization's workload. In another embodiment, there could be an annual or semi-annual review in detail of the most important partners and a high-level review of the other partners at the same time or less frequently.

The tasks in the "CONTROL" step should be selected to match the organization's situation. One simple embodiment of the "CONTROL" step includes only the following critical sub-tasks:
"Define monitoring standards and schedule"
"Implement monitoring plan".

Another embodiment of the "CONTROL" step also incorporates the following sub-tasks in order to provide greater assurance that the most important partners continue to meet the capability objectives:
"Define guidelines for performing a detailed review, audit and/or test of Partners". The purpose of this step is to identify how to verify whether partners who say that they meet the defined objectives actually do meet them. Many review techniques are possible. For example:
Partner self-certification—one of the least expensive and least intrusive is to require that partners to electronically sign that their capability or compliance meets the stated objective or to state where they fall short.
Affidavit—require an affidavit that the partner meets the objective. The affidavit can be scanned and uploaded into IT automation that supports PCI or simply mailed or faxed
Procedures or report—Ask partners to upload their detailed procedures or system report (e.g. inventory buffer stock report) that pertains to an objective
Document review—Asks partners to provide comprehensive documents that cover a domain (e.g. Business Continuity Plan)
Contract—Modify contractual agreements to include the objective
Audit—Visit partner sites to perform on-site audits
Physical proof—For example, a partner proves that key components may be manufactured at an alternate site (i.e. not the normal sites) by manufacturing the components at the alternate site and then sending the parts to the organization for testing "Define criteria for which Partners should have a detailed review, audit and/or test". For example, in one embodiment partner self-certification and possibly affidavits may be required of all partners while audits and contractual changes may be required of the top 10% of partners by revenue Another embodiment, is to incorporate the new partner capability objectives into existing partner performance monitoring. One example of this includes adding the objectives to an existing annual review checklist. Another example applies to organizations that calculate a performance score or quality score for partners. In this case, the new capability objective can be incorporated into that score.

Another embodiment includes a hand-off of responsibilities for the partner capability objective to a different person or team for future improvements. In this case, a document to "Define ongoing owner and governance of standards" is helpful.

Another embodiment includes the sub-task "Evaluate project versus project expectations" which looks for lessons learned for the benefit of future PCI efforts.

Finally, after completing a PCI effort, the PCI methodology may be repeated for the same domain on a periodic basis. One reason for doing so is to keep up with the changing nature of requirements and regulatory environment. For example, a business continuity improvement effort may be repeated annually or semi-annually. Another reason is to put in place a regimen of continuous improvement.

In addition, multiple PCI efforts may take place at the same time in the same organization's partners, each one aimed at a different partner domain. For example, one embodiment of PCI may run from January through March for Country of Origin labeling laws and regulations for suppliers, another from February through April for compliance with lead-free laws and regulations for suppliers and a third during the month of April for supplier environmental policies. Another embodiment could cover all three domains in one PCI project running from January through March.

Isolation of Domain Expert Input

In one embodiment, Domain Expert inputs are isolated so that PCI is not tied to a specific domain. As a result it can be applied to any partner domain needing improvements. The key areas of Domain Expert input are to:

Metrics (part of the Measure step)
Define Campaign Requirements (part of the Plan Campaign task which is part of the Measure and Improve steps)
Support and Detailed Review (part of the Execute Campaign which is part of the Measure and Improve steps)
Identify Improvement Solution (part of the Improve step)
Evaluate Project Versus Expectations (part of the Control step)

Metrics: Gather organizational input is the first task in the "MEASURE" step (FIG. 4). A Domain Expert works with the Improvement team to determine the metrics that will be used to baseline partner capabilities. Each subtask of "Gather organizational input" is required.

FIG. 11 Domain Metrics Example is one embodiment of metrics for the domains Business Continuity, Country of Origin, Lead-Free and Social Responsibility. In one embodiment, PCI is applied to multiple domains within single, consolidated project. In another embodiment, PCI is applied to one domain at a time, such as a lead-free initiative. Defining the Unit, Opportunity, Defect and Critical to Quality Specification are the critical components for defining the right metrics.

Define Campaign Requirements:

In an embodiment of PCI directed at many partners, the Domain Expert participates in the "Define campaign goals, objectives and success criteria" subtask that defines the strategy and tactics for the "Measure" or "Improve" campaign.

It is very common for different domains to differ greatly in the survey data they require from partners. Therefore, it is common for some survey data requirements to differ from one domain versus another. That is why domain expert input is valuable in defining survey data requirements (this is one embodiment of the "Define Partner requests (e.g. provide survey data, address capability gaps)" task).

To illustrate the survey differences and the need for domain expert input, "FIG. 12 Sample Survey Fields for a Few Domains" summarizes the partner survey data that is requested in one embodiment of PCI. The leftmost column lists the key forms presented to partners and the second column shows survey data fields. These two columns along with the "Field Type" column are the key inputs from the Domain Expert and Improvement Team to the person who finalizes the wording of the questions and then forwards the resulting survey data requirements to IT.

Note: The rows with a "Yes" in the column labeled "All" contain fields that may be relevant to all the listed domains. The fact that many data elements apply across many domains illustrates synergies in approaching the different domains with a common PCI approach. In addition, the technology and PCI method are flexible to the areas domains differences since domain inputs have been isolated. A "Yes" in one or more of the domain columns indicates that the field is not relevant to all partner domains but is relevant to one or more. FIG. 12 is just one embodiment. Other embodiments could have more or fewer domains and questions. In addition, some organizations may run surveys for different domains either together or independently. In another embodiment, industry organizations and other multi-organizational associations could agree on a comprehensive standard list of questions (e.g. in order to help association members to increase capabilities or to solve common issues).

The Domain Expert is expected to contribute a lot of input into partner requests. For example, in one embodiment the Domain Expert provides input on which data should be requested from the partners and how the survey might vary for different partner types, activities, and other stratifications of the partner organizations. In this embodiment, the "Adapt data requirements per type & importance of Partner" and "Define detail review requirements & criteria for top Partners" tasks may be added and the Domain Expert may provide valuable input to tailor the survey to the needs identified in the "DEFINE" step.

There are several media different ways that a survey may be delivered. For example:

By the internet using a Web application
By email
By telephone
By mail

In addition, one or more of these communication media may be used in the same PCI embodiment. For example, in one embodiment, a request is emailed to the partner. Then an email is sent ten days later to partners who have taken no action. Next, a telephone follow-up is made a week later.

Figure 9:
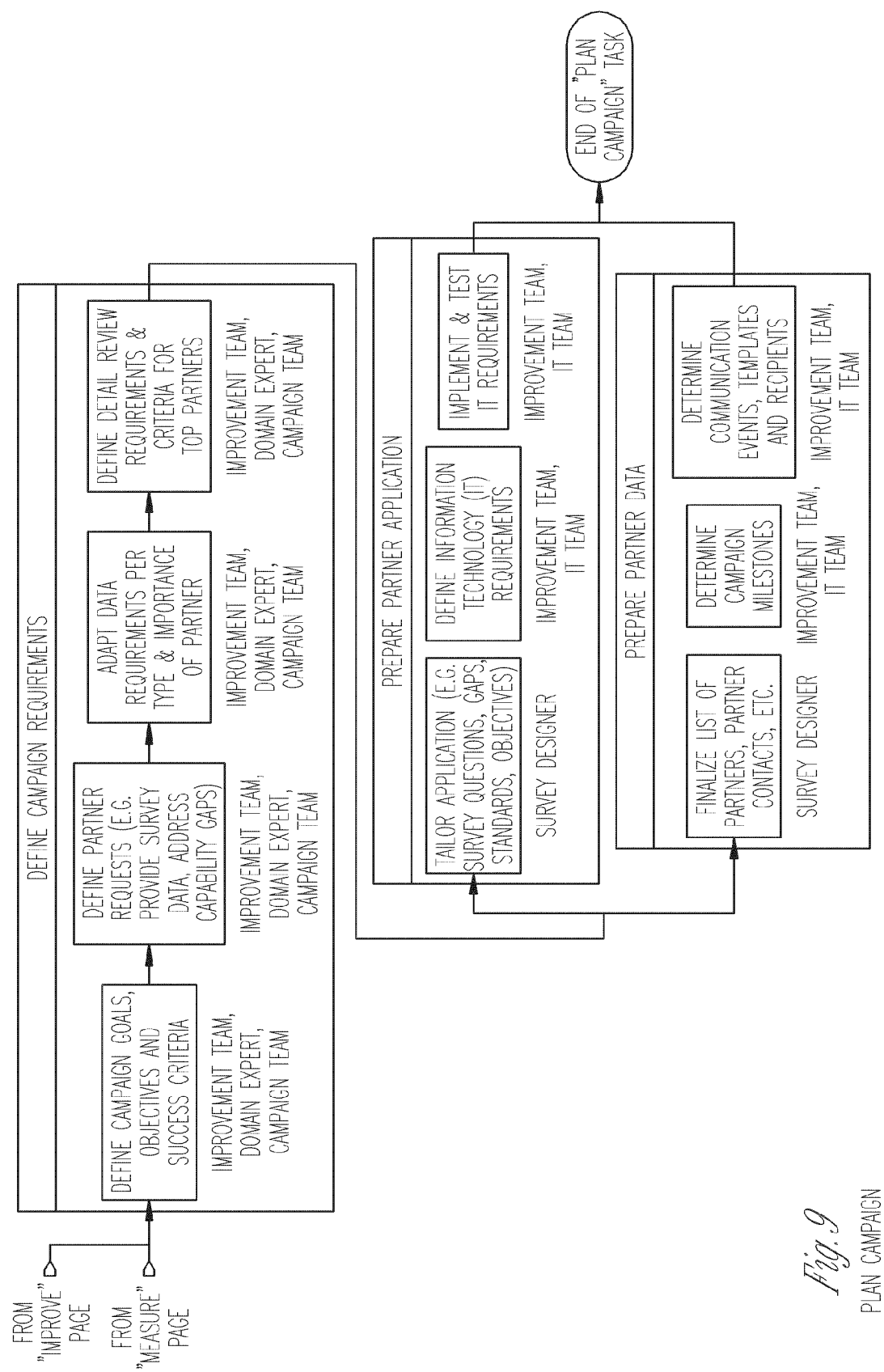
FIG. 9 illustrates the sub-tasks in the "Plan Campaign" task. The "Plan Campaign" task is referenced in the "Measure" step and in the "Improve" step of the PCI method.

Just as Domain Expert can offer valuable input to survey requirements, they can also provide valuable input to the other subtasks of the "Define Campaign Requirements" task shown in FIG. 9.

Support and Detailed Review: Support and Detailed review occur within the "Execute Plan" task, which is in both the "MEASURE" step and the "IMPROVE" step. The Domain Expert plays a reactive, second-level support role, helping to resolve domain business issues. For example, a partner may want help understanding what needs to be in an effective Code of Conduct (for the Social Responsibility domain) or in a site salvage procedure (for the Business Continuity domain).

In one embodiment, the "Detailed Review" sub-task applies to all partners and is conducted after the partner submits a completed survey. Its purpose is to perform a quality and completeness check of what the partner has submitted. In another embodiment, the "Detailed Review" is performed only for the most critical partners. In another embodiment, the "Detailed Review" is performed based on data anomalies that are associated with inaccurate or incomplete data. This concept is similar to how the IRS decides which businesses and persons to audit. For example, rather than auditing all businesses or just the largest businesses, the IRS looks for data exceptions such as deduction amounts that are unusually large compared to income.

FIG. 13 Detailed Review Guideline Example includes the first page of guidelines for a Detailed Review by the Domain Expert, in this case for partner's Business Continuity Plan. In one embodiment, the guidelines are three pages long, in another just one page is needed while a third embodiment requires tens or hundreds of pages of guidelines, templates and instructions. In one embodiment, the Domain Expert is the main author of the guidelines. In another, the project manager or a technical writer writes them.

Identify Improvement Solution: "Identify Improvement Solution" is the first task in the "IMPROVE" step. In one embodiment, a Domain Expert works with the Improvement team to list and evaluate potential ways to improve Partner capabilities to reach objectives based on past experience and research. In another embodiment, the Domain Expert is involved in choosing which of the potential solutions to actually implement.

Evaluate Project versus Expectations: "Evaluate project versus expectations" is a subtask in the "CONTROL" step. In one embodiment, a Domain Expert provides useful input to the rest of the team in identifying lessons learned from the PCI project in order to improve the effectiveness of the next PCI project.

Information Technology for a System to Manage Partners

A system according to the present invention requires Information Technology in order to manage the large number of capability objectives required by each domain across many partners. FIG. 18 is a high-level summary of a use sequence and shows some key aspects of one embodiment of Information Technology for a System to Manage Partners.

The use sequence shown is:
1) DEFINE: The organization defines partner capability objectives in the system
2) MEASURE: The system gathers partner capability facts
3) ANALYZE: The system identifies gaps, i.e. partner capability facts that differ from objectives
4) IMPROVE: The system communicates gaps and associated recommendations and aids to partners
5) IMPROVE: The system tracks communications and partner progress until partners reach objectives
6) CONTROL: The system continues tracking and periodically requests updates from partners Definitions of terms used in FIG. 18 follow:
Partner Capability Fact:
  Actual data about partner capabilities
    e.g., actual responses to questions, existence/non-existence of supporting evidence for partner claims, reviewer approval/disapproval of partner claims, etc.
Objective:
  List of acceptable Facts for a capability
    e.g., desired responses to questions sometimes requiring sufficient supporting evidence and sometimes further requiring a review and approval by the organization
Gap: Fact not matching objectives
  Facts not on the list of acceptable Facts for a capability
    e.g., It is desired that partners have tested a certain procedure within the past 12 months. If the partner last tested the procedure 25 months ago, that is a gap
Recommendation:
  Description associated with Gap which illustrates the organization's change request for the partner's capability
    e.g., ISO 22399 requires companies to have a written crisis management procedure at least every year. Please test your written crisis management procedure and upload evidence that you did so into the system. For further information, see
Communicate & Track:
  Regimen to communicate and follow-up with partners to improve the capabilities highlighted by the identified gaps
    e.g., Initial email & follow-ups with link to gaps & recommendations report
    e.g., System records key events in a History table. Key events could include gap creation, gap closures, communications to and from partners, etc.

FIG. 18 shows some key aspects of one embodiment of Information Technology for a System to Manage Partners. Another key aspect not shown is automated reporting. Automated reporting provides visibility into the capabilities for each partner as well as across all partners. For example, without automated reporting it would not be practical to quickly get a list of all partners with a gap on a given capability or to keep up with continuous updates in partner capabilities as partners make progress in closing gaps.

Other potential aspects of another embodiment of Information Technology for a System to Manage Partners include:
  Data Correction & Augmentation—facilitates correction of partner data entry errors as well as augmentation of partner data from third party sources
  Capability Review—enables organization's personnel to review evidence for partner capabilities, create additional gaps or close gaps and to track such events in the central database.
  Scoring—rates and scores partners for their capabilities
  Gap Prioritization—in the "Analysis" step, gaps may be prioritized.
  Some gaps may be de-emphasized or closed across many partners.
  Help Resources—a set of templates, instructions and other tools to aid the partner in improving capabilities
  Support Request Tracking—tracks partner questions and the organization's responses
  Integration with Domain-Specific Modules—communication of data with other modules at the organization. Some embodiments could integrate user interface as well.

Information Technology (IT) Embodiment Examples

This section describes in detail various embodiments of a System for Managing Partners, included some advanced embodiments of the System. In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

It is possible for IT to provide automation for many of the PCI tasks. Some embodiments have more automation than others. Many of the embodiments described below illustrate advanced embodiments in order to show the potential for IT automation to realize greater efficiencies and effectiveness with more partners compared to what a more basic embodiment could illustrate. For example, one embodiment of IT automation consist the following software modules:

1. Flexible Standards-Based Measurement Tool (FSMT)
    Key aspect: Gathers partner facts
2. Gap Initiation, Review & Tracking (GIRT)
    Key aspect: Identifies and tracks gaps
3. System for Continuous Operational Risk Evaluation (SCORE)
    Key aspect: Rates & scores partner capabilities for domains
4. Security Administration, Data Management & Transfer (ADM)
    Key aspect: Management of data access
5. Global Latitude-Longitude, Address Standardization & Shared Sites ID (GLASS)
    Key aspect: Corrects and augments partner data
6. Communications Engine (COM)
    Key aspect: Automates communications to partners
7. Collaborative Help Resources (Help)
    Key aspect: templates, instructions and tools for partners
8. Reporting Portal (Portal)
    Key aspect: visibility of capabilities across all partners
9. Support Request Tracking (Support)
    Key aspect: tracks partner questions and the organization's responses
10. Business Continuity Management (BCM) or other domain-specific module
    Key aspect: integration of the modules above with another specialized module(s) at the organization One embodiment could have all these modules. FIG. 16 shows a database schema for an embodiment of a database for a reporting portal. As can be seen in FIG. 16, a data center 150 (such as a server or collection of servers) is connected to a network 152 via network interface device 154 (such as a router, hub or switch). The database and its associated software according to one embodiment of the present invention is stored and executed on server 150.

FIGS. 14 and 15 show an embodiment of a database schema for all of the other modules. In one embodiment, system 100 implements all modules in one database schema while another could use multiple database. In one embodiment, system 100 implements a subset of these modules. A different embodiment could include some or all of the key underlying features but organized into different software modules. Another embodiment could organize the modules into one big module. Different embodiments could have all of the modules but with a subset of features or with additional features.

In one embodiment, the IT automation, data storage, IT reporting and analysis, and other aspects of IT are implemented by the organization within its data centers 150. In the other, they are implemented by a partner that provides software and services for managing partners for a number of client organizations.

A description of business rules and features of various embodiments of each module follows:

1. Flexible Objectives-Based Measurement Tool (FOMT)

In one embodiment, FSMT is a Web-based, adaptive application where each survey measurement (e.g. partner response or other facts) can be validated and related to specified objectives for a domain. FSMT is configured in the DEFINE step of PCI and then mainly used in the MEASURE and IMPROVE steps.

FSMT adapts the survey questions, validation and objectives per the type of partner and partner activity being surveyed. In addition, one embodiment enables the organization to require supporting evidence for any set of questions in the survey. In one embodiment, the module includes a way for partners and evidence reviewers to interact and track their interactions/communications during the review of the information and document evidence submitted by the partner. Key aspects of this module include:

Flexible, Adaptive Surveys for Any Domain
Partner Capability Review and Approval
Offline Data Entry Option
Flexible, Adaptive Surveys for Any Domain:
    This module adapts data gathering to any set of domains, objectives and partner types, partner activities, etc.
    In one embodiment, questions, responses, objectives (i.e. the set of responses to a question that meet the organization's objectives):
        Have configurable format, configurable validation, configurable navigation, configurable hierarchy and configurable grouping. The survey User Interface and reporting is created automatically from the configuration data:
            Configurable format: e.g. question subheadings, text, question number, question order, question help text, reference to an external standard or organizational document, and question short description for error messages.
            Configurable validation: e.g. validation type (e.g. drop down box list, date, integer, etc.), required/optional for different partner types and/or activities, question workflow, acceptable set of responses
            Adaptive navigation: e.g. Users have a way to navigate between multiple surveys; Contacts representing multiple partners (e.g. manufacturers representatives) navigate between their assigned partners; Partners contacts see the data only for their assigned partner(s);
            Configurable hierarchy: e.g. Questions can be related to the partner as a whole or units within the partner (e.g. sites, contacts, divisions, parts, etc.)
            Configurable grouping: e.g. Within a hierarchy, questions/responses/gaps may be presented in the User Interface and reports within summary categories
        May require supporting evidence for some or all questions:
            In one embodiment, the partner must upload a document showing supporting evidence if the partner response is in the list of acceptable responses for a question.
            In one embodiment, the partner uploads a document, links the document to the question that it provides evidence for. Such documents are then reviewed by the Domain Expert who can accept the evidence or mark it as insufficient. The User Interface makes clear to the reviewer and partner which questions have insufficient or missing evidence In another embodiment, the evidence is provided verbally (or by fax or email) to someone at the organization who marks the evidence for the question as acceptable or not.

May be related to one or more domains

May share some of the same configuration: e.g. some questions share the same answer list of values (e.g. Yes, No)

Questions/response/objective are related to an underlying partner data model (e.g. some questions related to partner as a whole, others to partner contacts, others to partner sites, others to partner parts, others to partner site/part/contact activities, others to just certain partner activities or partner types, etc., or to a subset thereof Are presented to the partner only if the partner has configuration data that matches the question conditions (e.g. the right domain, partner type, activity)

Allows more than one type of survey for each partner (e.g. for different domains or within the same domain)

Automatic report generation based on question configuration (i.e. adding a question adds reports/charts related to the question)

Are recurring. In other words, the organization asks similar questions each year and responses from the prior survey are saved as a starting point for the supplier for the next year. In another embodiment, the organization has additional one-time surveys for specific capabilities that are time-sensitive and not repeated/recurring.

Offline Data Entry Option:

In some situations, a partner contact person may not be able to immediately answer survey questions without research or forwarding questions to colleagues. In one embodiment, a supplier has to get such information for a long list of parts provided by the organization's web application. The web application allows the supplier to download a spreadsheet containing the supplier's parts and other related data in a certain format. The offline spreadsheet option allows the supplier to get input from supplier colleagues without having to train colleagues on how to use the web application. The offline spreadsheet allows the supplier to gather data from various colleagues by forwarding the spreadsheet by email. Once the supplier completes the spreadsheet, he or she can return to the web application, sign in and click an "Upload" button to browse to the spreadsheet and upload it. When the file is uploaded, the application performs a long list of validations. The first set of validations confirms that the column labels have not changed in any column as this may indicate a format chance (e.g. the suppliers added or deleted a column). After that, the application confirms that the values in each cell are valid. For example, it checks that the part # is one of the parts assigned to the supplier.

The application creates error messages if needed and associates them with the problematic line(s). The end user can correct the situation online or by downloading the errors to a spreadsheet to correct them there and then re-upload. An error message in the spreadsheet indicates which validation failed.

In another embodiment, a similar offline data process is followed for a different subset of survey data or even all the other survey data. In another embodiment, a similar offline data process is used for other partners (besides suppliers).

2. Gap Initiation, Review & Tracking (GIRT)

In one embodiment, a GIRT module identifies differences from objectives. GIRT is configured in the DEFINE step of PCI and then mainly used in the ANALYZE and IMPROVE steps.

Gap Initiation:

In one embodiment, gaps are generated as follows:

1. Automatically.

Gap business rules compare response to questions versus the response goals in order to generate a gap. For example, a multiple choice question may have multiple acceptable responses and other responses that generate a gap.

Questions can be configured to require evidence. Lack of evidence creates a gap. In one embodiment, certain question are configured to require that if the partner response to a question is among the list of acceptable responses, the partner must upload a document as supporting evidence. Lack of such a document creates a gap.

2. By a system user in the organization. A person in the organization can create or close a gap.

In one embodiment, a person performing a capability review may create a gap if the documentation shows that the capability is lacking or that there is insufficient evidence that the partner has the capability In another embodiment, a person in the organization may close a gap. For example, the person may close the gap if after communicating with the partner it is clear that the partner has the capability in place but could not receive permission from management to provide documentation Gap Closure:

In one embodiment, gaps are closed as follows:

1. Automatically due to change in organization

In one embodiment, an organization may decide to close certain types of gaps for a subset or all partners that have them.

For example, an organization may lower the priority of an objective/gap after reviewing the measurements of its partners, sometimes in order to help partners concentrate on the most important gaps. Another example is that gaps of a certain type may be closed after a certain date due to relative insignificance or due to giving up on attaining the objective 2. By a system user in the organization. A person in the organization can close a gap for particular partners.

3. By an action of a partner in the system, combined with a business rule.

For example, a partner may address a gap by making internal improvements and providing supporting evidence of the improvement Gap History:

In one embodiment, GIRT creates gap data objects, stores a history interactions between the reviewer and surveyed partner organization as well as a history of changes in gap status. In another embodiment, the objectives are hard-coded into a report which calculates gaps when it executes by comparing the partner responses to the hard-coded objectives in the report definition.

Partner Capability Review, Tracking and Approval:

In one embodiment, the organization selects a subset of (or all) partners to undergo a capability review by the organization's domain expert or other personnel. In one embodiment, the organization marks certain partners manually as requiring a capability review. In another embodiment, partners are selected based on automated business rules (e.g. suppliers who supply more than a given dollar amount of parts, materials or services or "premium" partners).

In one embodiment, when such a partner completes the survey, the Domain Expert (or other personnel from the organization) is notified to begin the capability review as soon as a selected partner submits a complete set of data and documents. In one embodiment, the system enables organizational personnel to pick selected partners that are ready for a capability review from a queue.

In one embodiment, the system enables appropriate organization personnel to

Review the partners data and documents in the system,

Record additional gaps in the system beyond those that were detected automatically by the system (e.g. supplier has a procedure but it is inadequate)

Have the option to provide comments to the partner. An automated history log stores comments to and from the partner, gap status events, etc.

In one embodiment, the system communicates gaps, recommendations and help materials to the partner as well as follows-up with the partner until the gaps are closed. In one embodiment, gaps on some questions or groups of questions are not communicated. For example, in one embodiment, prediction that the partner will go bankrupt are used by the organization but are not communicated to the partner.

In one embodiment, if the partner's information and documents meet the organization's standards, then the reviewer approves the partner.

In another embodiment, partners that do not close their gaps (or a prioritized subset of gaps) by a given date are flagged for additional motivation by the organization (e.g. purchasing can reiterate requirements to close gaps in order to stay a supplier).

3. System for Continuous Operational Risk Evaluation (SCORE)

In one embodiment, SCORE calculates summary statistics (e.g. a numerical score and rating) for a partner in one or more domains by comparing objectives to gaps and considering the importance of the gaps (e.g. points, "must haves", etc.). The numerical score and rating provides to the organization a quick summary of the partner's capability in one or more domains. In one embodiment, the scores are calculated based on business rules, configuration data (e.g. points to deduct for incorrect answers) and database data (e.g. from FSMT, GIRT, domain-specific applications and third party data). SCORE is configured in the DEFINE step of PCI and then mainly used in the ANALYZE and IMPROVE steps.

In one embodiment, the SCORE module calculates and overall rating (e.g. Green, Yellow, and Red) and numerical score for the partner and for the partners' sites. In another embodiment, a rating and score is calculated for the partner and its contacts. In another embodiment, a rating and score is calculated for the partner and its critical components or materials.

In one embodiment, scores are calculated by adding the points awarded for each question. An arbitrary cutoff is defined for each rating (e.g. Gold=80+ points, Silver=50-79 points, Bronze=35-49 points; Tin=0-34 points). In one embodiment, some questions have more points than others. In another embodiment, questions are of equal value.

In another embodiment, ratings are based on meaning. For example, "Red" means Lacking Fundamentals, "Yellow" means Partial (or uncertain) and "Green" means Sound Fundamentals. Unacceptable responses to "must have" questions result in a "Red" rating. Unacceptable responses to "nice to have" questions does not negatively affect the rating. Other unacceptable responses are sufficient to put the partner (or partner's site, or partner's contact) in the "Yellow" category.

In another embodiment of reporting based on the Altman Z bankruptcy model, the ratings are "Red" for Bankruptcy Predicted, "Yellow" for Uncertain and "Green" for Safe.

In one embodiment, a maximum and minimum score is assigned to each color rating. The importance of any unacceptable responses results in a rating, while the points assigned to questions result in deductions from the maximum score for the rating. In another embodiment, acceptable response result in additions to the minimum score for the rating.

In another embodiment, raw scores are normalized using a business rule (e.g. on a pro-rata basis) to a convenient scale such as 0-100. For example, if the maximum raw number of points is 212, achieving that number would result in a final score of 100.

In another embodiment, certain personnel from the organization can override ratings, points and scores.

In one embodiment, scores are recalculated for any changes that the reviewer or partner submits.

4. Security Administration, Data Management & Transfer (ADM)

In one embodiment, ADM keeps data secure and enables secure transformation/transfer of data per partner and client organization's requirements. ADM is configured in the DEFINE step of PCI and then mainly used in the MEASURE, ANALYZE and IMPROVE steps.

Data and Security Administration:

In one embodiment, a person in the organization is given an "Administrator" role in order to be able to correct partner set up data, provide support and to approve an account for a new contact person/system user at a partner. In one embodiment, the Administrator can see and edit any partner and can even edit information that the partner cannot, such as the partner type and partner name. In one embodiment, the application sends an email to the Administrator when a new account request is made. The request includes the person's contact information and partner organization name. In one embodiment, the partner enters their organization name in a text box (a drop down box is not used because no partner should be able to see the name of the other partners). The Administrator's form displays the partner organization name that the partner contact entered as well as a drop down box for the Administrator to match the organization name that was entered to the list that is in the database.

In order to cut down on requests for new accounts, one embodiment includes a "Forget your password?" link. Clicking on the link opens a form with an email address field. The partner types in their email address. If the email address is invalid, the application displays an error message. Otherwise, the application emails the new password to the partner.

In another embodiment, this functionality is not needed because all user accounts are handled by another system with which this system is integrated (i.e. "single sign on" feature).

Secure Data Transfer:

In one embodiment, ADM supports IT industry standards for secure transfer of data (e.g. XML, web service, EDI, SFTP, HTTPS, etc.) from the organization to partners so that partners can use the data that they entered for other customers as well. This provides added value to the partners and results in greater partner participation. In one embodiment, ADM enables partners to adjust the format of the data that they entered and to determine which data will be public and which stays private for other customers. In another embodiment, the organization outsources the IT and the secure data transfer is needed to get the data to the organization once the outsourced partner gathers the data on behalf of the organization.

5. Global Latitude-Longitude, Address Standardization & Shared Sites ID (GLASS)

In one embodiment, GLASS parses, corrects, standardizes and augments data entered by partners. GLASS is mainly used in the MEASURE step.

Data Parsing, Correction and Standardization:

In one embodiment, Data Analysts have screens that allow them to correct data. Rather than viewing partners one by one, they can view the contact data for all partners in one form. This allows them for look for mistakes in the formatting of telephone numbers that cannot be validated by the form. One embodiment of the application has a spell check which helps the Data Analyst to find and correct spelling mistakes in the contact's Job Title field. The Data Analyst can also sort by any column. For instance, sorting by Country shows a site in the city of Seoul in North Korea, so the Data Analyst corrects the country to South Korea. In another embodiment, data correction work is performed via spreadsheets and then the updated spreadsheet data is imported into the database. In another embodiment, spreadsheets are used as the data store.

Addresses are exported into an address validation application which standardizes the address format and corrects the entered address if needed. Valid address matches also are assigned a latitude and longitude, using third party software and service resources. Other addresses need to be handled manually by the Data Analyst.

Data Augmentation:

In one embodiment, data augmentation includes adding latitude & longitude to site addresses so that they can be mapped. In another embodiment, data augmentation includes adding partner financial data from a third party source. Still another embodiment augments partner data by identifying when the same subcontractor sites and critical services are used by different partners.

In one embodiment, the process for data augmentation is as follows: The Data Analyst sorts by country and city to try to find sites shared by more than one partner as well as critical service providers shared by multiple partners. For instance, several suppliers may outsource assembly to the same site in Taiwan. After identifying sites and services that are essential to many partners, the organization can work with the partners to mitigate the risk of many partners being stopped by the outage of a single outsourced site or service.

In one embodiment, data parsing, correction, standardization and augmentation work is performed in a database-driven application. In another embodiment, the work is performed using spreadsheets and then the updated spreadsheet data is imported into the database. In another embodiment, spreadsheets are used to both do the work as well as to store the data.

In one embodiment, the organization manages data changes such as partner organization merges, splits, adds and deletes as well as partner contact adds and deletes. In another embodiment, this work is outsourced to a partner service provider to perform on behalf of the organization.

In another embodiment, the Data Improvement step is skipped because of resource constraints in the organization.

In still another embodiment, financial information from third party sources is imported into the database (or spreadsheets) in order to be able to identify partners with financial issues early in order to limit product and service delivery risk from bankrupt partners or financially strapped partners.

6. Communications Engine (COM)

In one embodiment, COM sends notifications (e.g. email, letters, telephone calls) and processes emails and telephone calls received based on flexible workflow configuration and data in any data store (e.g. database, file storage, secure web service request, etc.).

In one embodiment, notifications can be sent in batch or ad hoc:

Batch: Can initiate running the application automatically according to a configurable frequency (e.g. by scheduled task)

Ad Hoc: Any appropriate module can call it as needed in real time to send it information needed to communicate to appropriate persons at partners or the organization In one embodiment, all communications are registered in a log so that later the organization can query on communications. In another embodiment, communications may be stored in advance of sending, to allow time to review, update or reschedule individual communications. In another embodiment, certain suppliers may be excluded from communications (e.g. due to a business rule such as don't send non-urgent communications if another communication was sent in the past few days; or don't send emails to a certain partner until a certain date).

COM is configured in the DEFINE step of PCI and then mainly used in the MEASURE and IMPROVE steps.

Various tools may be used to create a communications module. In one embodiment, email notification reminders are sent using a combination of Microsoft Access and Microsoft Outlook. In another embodiment, a person sends email notification reminders by copying and pasting a list of partner contacts from a database query into the BCC field of an email message.

In yet another embodiment, an enterprise, server-based application (e.g. Microsoft SQL Server 2005 Notification Services, Microsoft SharePoint, .NET, Java or another software package or a service provider that provides services hosted on the internet) sends emails or other communications media. Each communication is set up in advance based on four main inputs:

Event: The event specifies when the notification should be sent. In one embodiment, a notification is sent when to thank the partner when the survey is completed. In addition, time-based notification reminders are sent if the partner did not complete the survey after a certain amount of time since the survey period started.

Template: The template is the format of the email with some variables. For example, it allows the recipient's first name to be printed after "Dear . . . ", the partner's name and the contact login and password to be in the message Data Source This is the data that is applied to the template in order to create the email notification. In one embodiment, the data source may be a database query, function or stored procedure. In another embodiment, the data source may be a file.

Who to send it to. In one embodiment, this is specified by partner contact role (e.g. email to the partner BCP contact and cc the partner account manager). In another embodiment, it is specified by including a SQL script Media: In one embodiment, the communication is sent by email or SMS. In anther embodiment, the communication is sent by letter, followed up on by automated telephone calls if there is no response to the letter.

7. Collaborative Help Resources (Help)

In one embodiment, Collaborative Help Resources aid partners in understanding how to close their gaps and makes it easier for them to do so. Collaborative Help Resources are configured in the DEFINE step of PCI and then mainly used in the IMPROVE step.

Different embodiments of Collaborative Help Resources include any one, more than one or all of the following:
Collaboration
Training
Self-Help
Workflow
Document Management Collaboration:

In one embodiment, the organization sets up a collaboration website facilitates knowledge sharing between different partners and between partners and the organization. In one embodiment, the collaboration website enables the partners to share information, provide mutual support and to give feedback to the organization through forums, blogs, social networking and wikis. In another embodiment, collaborative document management enables partners and the organization to securely review and make edits to the same document even though they are in different locations. In another embodiment, the organization uses the collaboration website for quick, ad hoc surveys of some or all of their partners. In another embodiment, a blog allows Domain Experts and others in the organization to communicate without sending emails. In another embodiment, communication between partners and with the organization is enhanced by group calendars, social networking software, blogs, wikis and ad hoc surveys and participants also make use of automated email notifications, RSS, SMS, instant messaging, VoIP, real-time presence, task coordination and issue tracking.

In another embodiment, partners pose questions and answers to each other in a forum. For instance, they are able to discuss how others are planning to address the risk of a possible Flu Pandemic or to exchange information on useful third parties to help to address gaps (e.g. consultants, associations, software, and service providers).

The organization also taps the collective intelligence of hundreds or thousands of partners to identify opportunities, risks and solutions to issues. For example, previously, risk data was mainly available from insurance companies. Yet in one embodiment, hundreds or thousands of partners acting together provide collective intelligence to the organization about which risks are most common in different parts of the world or and which subcontractors and critical service providers are used by the most partners.

Training:

In some embodiments, automated training techniques enable the organization to efficiently train large numbers of external organizations. In one embodiment, a website makes self-help documentation (e.g. templates, instructions, best practices, videos, examples) available to partners. In another embodiment, the survey can incorporate interactive quizzes/answers as well as self-help documentations. In another embodiment, software automation is made available to partners to directly increase their capabilities. For example, risk processes can be strengthened through risk assessment software as well as software to create plans for emergency management, recovery and restoration.

Self-Help:

In another embodiment, a self-help website is set up with templates, samples, instructions, training videos and software to help partners to address gaps. The self-help materials cover all aspects of implementing sound domain capabilities at the partner. For example, in one embodiment, the self-help website is for the Business Continuity domain, and covers all important areas of Business Continuity, such as BCM Policy, Site Risk Assessment & Impact Analysis, Prevention and Mitigation, Emergency Response, Crisis Management, Recovery, Restoration, Training, Testing & Ongoing Governance. In another embodiment, the self-help website is combined with the other collaboration and training approaches described above.

Workflow:

In one embodiment, a survey status field and data completion states are used for reporting partner status. The status field starts with "Incomplete". In one embodiment, the partner emails the support team or Domain Expert to ask for clarifications, more documents, etc. In one embodiment, the survey status changes automatically to "Complete" when the partner provides all required information and clicks a survey button to indicate that the survey is complete.

In one embodiment, a notification system follows-up with partners automatically until they meet objectives. In another embodiment, any partner not meeting the objectives (or a subset thereof) by a deadline are escalated to partner managers who apply additional persuasion or find other partners.

In one embodiment, completed survey information is then reviewed by a Domain Expert. When asking for clarifications, the Domain Expert changes the status to "Clarify". After the partner satisfies the organization's request, the Domain Expert changes the status to "Approved". The application records the update person, date and time for every update.

In another embodiment, there is no status field but there are date attributes for the "Complete" date, the "Clarify" date and the "Approved" date.

In one embodiment, the Domain Expert is assigned an application role that enables him or her to see the information from all the partners. On the other hand, an individual partner can only see the one partner's survey information so that each partner's information is kept confidential.

In another embodiment, there is no detailed review and the partner is considered complete when the partner provides all required information and indicates that the survey is completed. In this case, there is no need for the Domain Expert to be able to see the information from all the partners.

Document Management:

In one embodiment, the organization wants to review partner plans, procedures or policies for some of the Domain surveys to certain types of partners. In this embodiment, partners use a web application to upload documents into a database. In one embodiment, a web application presents a template document for the partner to download, fill out and then upload. In other embodiments, partners do not need to use the template document and can upload a document in any format. When uploading a document, the partner chooses which sites it applies to. Every document uploaded by partners is archived. Deleting a file brings back the previous file from archive. In other embodiments, software provides forms that adapt the questions, help text, etc. to the type of partner and store the responses in a database. Another embodiment may combine document templates, partner documents and adaptive software.

In another embodiment, the organization wants to review partner documents but does not have a document management system. Therefore the organization emails the document template and receives completed documents by email and stores them on a PC or shared network drive.

8. Reporting Portal (Portal)

In one embodiment, a Reporting Portal provides visibility at all times into partner-specific information as well as cross-partner summaries and comparisons. The Reporting Portal is configured in the DEFINE step of PCI and used in all the other steps.

Report Creation:

Software module that that enables the organization to produce reports on the data collected from partners. In one embodiment this is a web-based portal with standard and ad hoc reports, charts, dashboards, analysis, benchmarks and campaign management. In another embodiment, it is a simple module using office productivity application such as Microsoft Access and/or Microsoft Excel.

In one embodiment, a single Portal is used to report the data from multiple domains. In one embodiment, a web page includes dashboard charts showing key metrics from multiple domains. In another embodiment, the Portal includes not only reporting but also collaboration technologies for the organization's team (Note: this collaboration is separate from the collaboration between partners). Examples of collaboration tools include group calendar, social networking software, blogs, wikis, automated email notifications, RSS, SMS, instant messaging, VoIP, real-time presence, task coordination, document management and issue tracking. In another embodiment, the Portal is a document management system that allows team members to post reports that they produce without a formal reporting software program.

In another embodiment, the Portal is customized for a single domain, Business Continuity Management. The home page includes collaboration features discussed above plus a Business Continuity Summary chart that shows the number of partners with Green/Yellow/Red overall Business Continuity rating. In one embodiment, clicking the chart opens up the different categories of Business Continuity of which the overall rating is composed. In one embodiment, the overall Business Continuity rating is composed of separate ratings for the categories Bankruptcy Risk, Disaster Risk and Day-to-Day Interruption risk. In one embodiment, clicking the Business Continuity Summary chart opens up a separate chart for Bankruptcy Risk, Disaster Risk and Day-to-Day Interruption risk. In one embodiment, each separate chart shows the number of suppliers with a Red/Yellow/Green/Unknown rating for that category. In one embodiment, clicking on a category opens charts showing the ratings for subcategories. In one embodiment, clicking on the subcategory chart opens a report showing summary data for each supplier for that subcategory.

In one embodiment, the Bankruptcy Risk category is composed of the following subcategories:
  Altman Z Financial Risk Score (Altman, NYU, 1968, revised 2000),
  Qualitative Financial Risk score (based on qualitative questions like "Has you company announced layoffs of more than 20% of the workforce in the past year?") and
  Third Party Risk (based on data imported from Third Party Risk rating organizations such as Dun & Bradstreet, Moody's, S&P or Fitch, etc.).

Another embodiment could categorize Bankruptcy Risk differently or focus on a subset of Bankruptcy Risk.

In one embodiment, the Disaster Risk chart is composed of the following subcategories:
  BCM Policy & Management Review
  Site Hazards & Prevention
  Critical Material, Product and Service Providers
  Site Emergency Response
  Site Crisis Management, Recovery & Restoration
  Site Testing & Ongoing Governance Another embodiment could categorize Disaster Risk differently or focus on a subset of Disaster Risk.

In one embodiment, the Day-to-Day Interruption Risk is composed of the following subcategories: Facilities & Security; Fire & Flood Protection; IT & Telecommunications; Labor; Power; Transportation.

Another embodiment could categorize Day to Day Interruption Risk differently or focus on a subset of Interruption Risk.

In another embodiment, the Business Continuity Summary chart is made up of completely different categories. There are categories for Business Continuity document (e.g. whether the partner provided one, review status, review rating), the recovery time objective metrics and alternate site capability. In one embodiment, categories and the tree structure are configurable. In another embodiment, drilling down on a chart yields a different result (e.g. opening up a report or a document).

In one embodiment, each question is assigned to a subcategory, which then rolls up to a category which roles up to the overall business continuity domain, which then rolls into dashboards showing key metrics for multiple domains. In another embodiment, questions can be assigned to multiple subcategories. In another embodiment, additional levels are added to the hierarchy. In another embodiment, some levels are removed. In another embodiment, the levels are named differently.

In another embodiment, the Reporting Portal includes a number of standard reports on the data, such as supplier status summaries, site summaries, critical parts summaries and contact summaries. In another embodiment, the Reporting Portal enables team members and others from the organization to create new "ad hoc" reports. In another embodiment, the Reporting Portal includes the collaboration tools, the dashboard charts, standard reports and ad hoc repots.

In one embodiment, some reports and charts are generated automatically based on survey question configuration data. There is a stored procedure that is passed the question identifier based on user events (e.g. clicking on a report title). The stored procedure then reads the question configuration data to produce report formatting such as the title, question and answers. Before executing the report, the reporting application prompts for user-enterable report parameters such as partner type or name if applicable. In one embodiment, a report and chart display the percentage of partner organizations with each of the answers to the question (E.G. 42% answered Yes, 45% No and 3% Unsure). In another embodiment, a report and chart show all the questions and responses by a particular partner. In another embodiment, a report lists all the partners with a particular response to a particular question (e.g. List of Partners with no Sprinklers). In one embodiment, the user interface for submitting reports is also based on question configuration data. For instance, the report menu adds report links, reports and charts automatically when new questions are configured. In another embodiment, reports include
  Report Delivery:

In one embodiment, automated reports have many options for delivery: email subscription, email body, email attachment, SMS notification, RSS, Twitter, document management system post, paper, web service, SFTP, EDI, HTTPS, Excel, XML or other file format. In another embodiment, reports are sent manually by email or mail.

Reports are used by various persons in the organization (e.g. partner managers, domain experts, project managers). In addition, select reports are made available to the partners (e.g. a report of the questions and their responses; a report of partner gaps and recommendations). In one embodiment, reports for partners are made available for each partner in the FSMT user interface.

9. Support Request Tracking (Support)

In one embodiment, a Support Request Tracking module is used to ensure that partner questions are answered in a timely fashion for an organization that make certain personnel available to support some or all partners. Support is configured in the DEFINE step of PCI and then mainly used in the MEASURE and IMPROVE steps.

Support Request Tracking (Support):

In one embodiment, support software tracks whether team members provide timely answers to partner questions.

In one embodiment, partners go to a website to create a support request. In another embodiment, partners email requests to an email alias which-multiple people read or to a specified person. In another embodiment, partners email support request to an alias which loads it automatically to the Support module as a new Support Request or as an addition to an existing Support Request. In another embodiment, software enables self-help support by making a support knowledge base and resolved support cases available to all partners (with confidential data hidden). In one embodiment, the ability to request support and search the knowledge database and Frequently Asked Questions is integrated into FSMT.

In another embodiment, the organization responds to emailed support requests/questions from partners, without a formal support software module.

10. Business Continuity Management (BCM) or Other Domain-Specific Module

In one embodiment, it is not necessary to have a domain-specific module because the FSMT module and related modules are flexible enough to accommodate all domain-specific needs. In another embodiment, there are limitations in the types of information that FSMT supports. In this embodiment, a separate domain-specific module is added for such information. In one embodiment, the modules described above integrate with existing, legacy, domain software modules. In one embodiment, the domain-specific module is integrated into the User Interface of FSMT such that the partner does not perceive a difference from a User Interface standpoint. In another embodiment, the domain-specific module has a separate User Interface. In one embodiment, a domain-specific module is used in the same PCI steps as the FSMT module.

Business Continuity Management (BCM):

A domain-specific module for BCM is described in this document to illustrate an example of a domain-specific module, In one embodiment, this is a Web-based, software module that collects and validates partner business continuity data (e.g. subcontractor sites, critical service providers, alternate site recover plans and recovery time estimates for key sites, parts, site activities and part activities). In another embodiment, this is a software module that aids partners in creating BCM process documents.

In one embodiment, the user interface of the BCM module is integrated with the user interface of the FSMT module so that suppliers need to complete just one survey to provide the data required by both modules. In another embodiment, the BCM module (or other domain-specific module) could be integrated with any of the other modules.

Other Domain-Specific Module:

In another embodiment, a domain-specific module is implemented for other domains. FIG. 12 lists Country of Origin, EU RoHS, Lead-Free and Social Responsibility as examples of other domains. These are just a subset of the potential domains. For example, other domains include environment, health, safety, security and quality.

In another embodiment, there would be no domain-specific module. Instead, all domain-specific questions are incorporated into the FSMT and related modules.

IT Data Storage

In different embodiments, different IT applications can differ in how they store they data relevant at each step of PCI. Data storage may be implemented in many different types of applications including custom-built transactional database systems, custom-built data warehouses, office productivity applications, applications hosted by vendors, vendor applications installed in-house, custom-built applications, email survey tools, web-based survey tools, outsourced service providers, etc. In one embodiment, the whole PCI methodology may be implemented in one such application while in other embodiments different ones of these applications and storage may be mixed and matched for a project. In another embodiment, part of the PCI method is supported by IT while other parts have limited or no automation.

There are many ways to store partner information that is gathered for the System and Method for Managing Partners. One approach is to use a database, such as Microsoft SQL Server, Oracle, IBM DB2, My SQL, Microsoft Access, etc. This is particularly useful in embodiments of PCI that entail many partners. Another embodiment with say, just a couple dozen partners may use office productivity applications such as spreadsheets and word processing documents.

FIG. 14 provides an example of data content and structure in one embodiment of an initiative. It is meant as just one example of an embodiment of data storage. An advanced example was chosen to illustrate more kinds of data and insights than possible with a smaller data store. Another embodiment could have a portion of similar data in far fewer tables. A different embodiment might add even more tables to get additional insights into partner capabilities, to achieve additional improvement objectives or to add domain-specific data elements.

Keep in mind that the same kinds of data described for the tables below can be implemented in other types of applications and storage besides databases. For example, similar data can be stored in spreadsheet tabs, rows and columns in a different embodiment. For example, an embodiment may use spreadsheets to store hazardous materials use and controls while also storing partner information about social responsibility. In another embodiment, separate word processing documents may be sent out to each partner to gather information. In another embodiment, electronic survey tools and websites may be used to gather and analyze partner capabilities.

The important point is that the System may be implemented in many ways. The following section describes one such embodiment and is illustrated by FIGS. 14, 15 and 16.

FIG. 14 shows the Integrated Entity Relationship Diagram (ERD) for one embodiment of storage that supports the System. FIG. 14 lists the tables, table identifiers, relationships to other tables (i.e. foreign keys) and the cardinality of the relationship (e.g. one to many, many to many, etc.).

The following group of tables in FIG. 14 store system users and their access rights as part of one embodiment of a Security Administration, Data Management & Transfer (ADM) module:

aspnet_Applications
  Stores the list of applications. An application is a grouping of sets of features
aspnet_Membership
  Stores user logins and encrypted passwords aspnet_Users
  Stores the user/application relationship
aspnet_Roles
  Stores application roles, which are related to a subset of features.

In this embodiment, the roles are partner (this role is used to restrict a user to seeing only the information related to the partner's own organization), reviewer (can view and edit all partners but cannot change system configuration) and administrator (complete access). All the teams in PCI may be assigned one or more of these roles In another embodiment, more roles could be defined in order to have more fine-grained control. For instance, a new role could be created for the Campaign Team to allow them to see all partners data but not edit them In another embodiment, there could be just two roles: partner and administrator aspnet_UsersinRoles the set of roles for a user

SYS_USER

Stores the relationship between contacts and aspnet_Users. If a contact is not in this table, he or she cannot log in. This feature allows a contact to be entered into a system without allowing the contact to have access to the system A variation of this embodiment could have all the tables above except for SYS_USER. In this case, any contact would be allowed to use the system.

Another embodiment would have neither aspnet_Applications nor aspnet_Users. In such an embodiment, the assumption is that there is just one application for any user.

Another embodiment could combine the aspnet_Membership and aspnet_Users tables into one table that stores logins, passwords and users. No functionality would be lost in this case.

Another embodiment could have just two tables: one for user logins/passwords and other for roles.

The following tables store general information about partners. In one embodiment, these tables include both domain-specific data (e.g. Time to Recover a site after a disaster, which applies to the Business Continuity domain) as well as data that is useful across multiple domains (e.g. partner site address). Note: The embodiment shown below was initially for supplier management and then applied to partners in general. Therefore some tables holding partner information have "SUPPLIER" in their name. In another embodiment, "PARTNER" is substituted for "SUPPLIER" in table names in order to indicate that the table is used for all kinds of partners, not just suppliers. This concept applies to all tables and other data schema objects described in this document that have "SUPPLIER" as part of their name:

CONTACT

Stores records for people who have been entered into the list of contacts for some partner

PART

The list of products or services that the organization purchases from suppliers or other partners

SITE

The list of partner locations (e.g. manufacturing plant locations)

DOCUMENT

Stores all the documents uploaded by partners

SUPPLIER

Stores the list of valid suppliers (or partners in general) to the organization.

SUPPLIER_CONTACT

Allows a contact to be related to more than one partner. For instance, a manufacturer's rep may represent more than one partner

SUPPLIER_DOCUMENT

Stores the relationship that ties a particular DOCUMENT file to a particular partner.

SUPPLIER_PART

Stores the relationship that ties a particular PART record to a particular partner. For example, this allows the system to list the products or services that the partner sells to the organization

SITE_PART

Stores which parts are produced at which sites by the partner. In one embodiment, this information is used for improving Country of Origin compliance. In another embodiment, this table is used to gather part-level recovery information for Business Continuity. In a more general embodiment, this table is called PARTNER_PRODUCT_OR_SERVICE, and may include many types of parts, materials, services, etc. that different types of partners provide

SITE_ALT

Stores alternate site information for a production site. In one embodiment, this information is used to determine which other sites may be used to recover a destroyed production site in a PCI effort focused on Business Continuity.

CYCLE

Stores the name of the current PCI effort and its start and end date

This table can be related to partner measures and objectives to store trends over time

DOMAIN

Stores the subject areas of the capabilities that are measured and improved by PCI. For example, business continuity, quality, etc.

SUPPLIER_TYPE_DOMAIN

Relates DOMAIN and SUPPLIER_TYPE so that all the suppliers in certain supplier types will be measured as part of a PCI cross-domain improvement effort While one embodiment may store data similar to that stored in all the tables above, another embodiment may store only "SUPPLIER" (or "PARTNER") information. In this case, data would be gathered for the partner as a whole and there would be no lower level of detail about parts, sites, etc. for a partner. In this case, information for the partner contact might be stored the "SUPPLIER" (or "PARTNER") table so that there would be a person in the database who could be contacted for the partner.

Another embodiment could add CYCLE in order to be able to compare trends over time.

Another embodiment could add SUPPLIER_TYPE_DOMAIN (or PARTNER_TYPE_DOMAIN) and DOMAIN in order to apply PCI to some partners but not others for a certain domain. For example, transportation service providers are not included in the lead-free improvement initiative.

Another embodiment could add "CONTACT" and "SUPPLIER_CONTACT" as well in order to store contact information for multiple people who work at the partner.

Another embodiment could add "DOCUMENT" and "SUPPLIER_CONTACT" management to "SUPPLIER" in order to enable the partner to upload documents such as policies, procedures and plans.

Another embodiment could have SUPPLIER, CONTACT, SUPPLIER_CONTACT, SITE and SUPPLIER_SITE in order to store information about multiple locations for the partner and multiple contacts as well. For example, one manufacturing partner might have 4 production sites and 2 contacts and another partner might have 30 sites and 15 contacts.

Another embodiment could add PART and SUPPLIER_PART as well in order to ask the partner about information for critical parts that the partner provides to the organization.

In one embodiment, the following tables are important for defining objectives and measuring current partner capabilities (FSMT module):

SURVEY
List of all surveys. There may be more than one survey at one point in time in the past, present or scheduled for the future
SUPPLIER_SURVEY
List of surveys for one particular partner. A survey may be required of a subset or all partners
SURVEY_ITEM
Question or other capability area. Link to supplier, site, part, contact, etc. as needed
SURVEY_ITEM CONTROL
User interface control for question (e.g. drop down box)
SURVEY_ITEM_LIST
List of values name
SURVEY_ITEM_RULE
Validation dependency between questions (e.g. if the answer to question 1 is Yes, then question 6 is optional)
SURVEY_ITEM_RULE TYPE
Validation type (e.g. required/optional)
SURVEY_ITEM TYPE
Data type for validation (e.g. number, text, integer)
SURVEY_ITEM_VALUE
Full individual list of values for question In one embodiment, the following tables are important for:
Identifying gaps, reviewing partner capabilities and tracking partner gap history (GIRT module)
Scoring and rating partners (SCORE module).
SUPPLIER_SURVEY_ITEM
Supplier fact (e.g. actual response to a specific question), gap, reference, associated points
SUPPLIER_SURVEY_ITEM_COMPLETENESS
Question event history (e.g. when opened, closed, etc.)
SUPPLIER_SURVEY_ITEM EVIDENCE
Documents uploaded by the partner to support a claimed capability In one embodiment, system 100 uses a completely different set of tables for defining objectives and identifying partner gaps. This embodiment is described below by the tables prefixed by "OBJECTIVE_". This different embodiment illustrates that there are many possible embodiments of a System and Method to Manage Partners. For example, in one embodiment, the following tables are used to define objectives:

OBJECTIVE
Stores the objective name and other basic information
OBJECTIVE_DOMAIN
Allows objectives to be grouped into a domain, such as business continuity or hazardous substances
OBJECTIVE RULE
Stores the comparison for the objective. For example, a rule record could store something to the effect that recovery at an alternate site must take no longer than a number that is stored in the related OBJECTIVE_THRESHOLD record
OBJECTIVE_THRESHOLD
Stores the number to which the rule is compared. For example, 4. So, the rule and threshold together make a standard such as recovery at an alternate site must take no longer than 4 weeks.

In one embodiment, system 100 uses a single objective table to store the objective. Another embodiment could have the RULE and THRESHOLD stored in a single table.

In one embodiment, system 100 adds an OBJECTIVE_CYCLE table to store the deadline for the objective for the campaign cycle. Without this table, the end date that is stored in the CYCLE table could be used as the deadline for every objective.

In one embodiment, system 100 stores the objectives in the software code (i.e. "hard coding") instead of using tables. Another embodiment may use spreadsheets and other files to store objectives, gaps, etc.

Once the basic definition for objectives is stored as described above, objectives may be applied to any number of supplier-related (or partner-related) tables in order to apply the objective to the appropriate capabilities of the partner organizations.

For example, in one embodiment, the objective is applied to the partner as a whole. A table like OBJECTIVE_SUPPLIER (or OBJECTIVE_PARTNER) may be used for that. In the same embodiment, there may be objectives that are applied to all the partner's sites using a table like OBJECTIVE_SITE. In the same embodiment, there may be other objectives that may apply to all partners of a certain supplier type category so an OBJECTIVE_SUPPLIER_TYPE (OR OBJECTIVE_PARTNER_TYPE) table is added for that.

OBJECTIVE_SUPPLIER
Stores objectives that are applied to all partners as a whole
OBJECTIVE_SITE
Stores objectives that are applied to all the sites of each partner
OBJECTIVE_SUPPLIER_TYPE
Stores objectives that are applied to all the sites of each partner Other embodiments may include objectives linked to other tables in the data model. For example:
OBJECTIVE_PART
OBJECTIVE_DOCUMENT
OBJECTIVE_CONTACT_ROLE
OBJECTIVE_SITE_ACTIVITY_TYPE Business rules determined in the PCI "IMPROVE" step are used to apply the objectives defined in the tables above to partners. For example, one embodiment may have a business rule that says that all partner sites must pass the objective in the OBJECTIVE_SITE table. Another embodiment might use a different business rule that says that a partner is OK if any of the partner's sites is OK.

Additional tables may be added to a data model in order to measure and report current capabilities in different ways. For example, the embodiment of PCI illustrated in FIG. 14 also includes the following tables:

COUNTRY
List of all the countries in the world. This is useful in storing a main headquarters address for the partner, site, and/or contact
BUSINESS_UNIT
List of the organization's business units, for organizations with multiple divisions or subsidiaries
SUPPLIER_BUSINESS_UNIT
Stores which of the organization's business units are served by the partner
SUPPLIER_TYPE
Classifies a partner, often based on the classes of products and services provided. Stores a list of classifications for the partner. For example, a list of Standard Industry Classifications may be stored here or the organization may use its own classification scheme
SUPPLIER_SUPPLIER_TYPE
Stores the classifications that a particular partner belongs to
SUPPLIER_TYPE_DOCUMENT
If different classes of partners should be given different document templates to complete, this table can store different document templates for different partner types in case the organization requires that partners be given document templates to complete While the FIG. 14 embodiment one set of tables, In one embodiment, system 100 implements the objectives, current capabilities and gaps though a different data storage schema. Another embodiment may have objectives that are so simple that tables are not needed to store them (e.g. they could be coded into business rules or reports). In one embodiment, system 100 includes "SUPPLIER_TYPE" tables, especially if measures and objectives are expected to vary by partner type, but not the objectives tables. In one embodiment, system 100 uses the BUSINESS_UNIT tables in case the organization wants to establish different measures and/or objectives for each of the organization's business units.

In one embodiment, system 100 uses tables added to enable certain data to be entered offline, such as in spreadsheets or in another system, and then allow that data to be imported. For example, the following tables might be used to import parts data about sites from an offline data source:
SITE_PART_IMPORT
SITE_PART_IMPORT BATCH In one embodiment, workflow statuses may be contained in the software code (i.e. "hard-coded"). In another embodiment, putting workflow sequences and statuses in tables can add flexibility. For example, the following tables may be used to store workflow and approval information:
WORKFLOW
SUPPLIER_WORKFLOW
SUPPLIER_APPROVAL
SITE_APPROVAL Organizations may request that the partner provide information about the partner's critical partners. In one embodiment, all the tables in FIG. 14 that contain "SUBCOMPONENT" in their name are used to store information about suppliers' suppliers of critical subcomponents or services. For example, the SUBCOMPONENT table can list different kinds of materials or parts in short supply (e.g. Silicon may be in a record in table SUBCOMPONENT). Then the supplier may be asked who manufactures the silicon that they purchase, where it is manufactured (SITE_SUBCOMPONENT can store information about where the silicon supplier makes the silicon), etc. Knowing the location of suppliers' suppliers that make items in short supply can help to uncover risky situations where many suppliers get the same material or part from a common supplier.

Other tables in the embodiment pictured in FIG. 14 include the following (note: different embodiments may include no similar tables or more than one similar table):
SYS_CONFIG
Stores system-wide settings
CONTACT_REQUEST
Stores requests from partners to establish a login and password. Such a request requires administrator approval
CONTACT_ROLE
Contact's responsibilities at the partner. For example, business continuity contacts, Country of Origin contact, etc.
CONTENT_TYPE
Document file type (e.g. spreadsheet)
SITE_CONTACT
The key partner contact for a partner site for a certain domain (e.g. emergency contact for business continuity)
SITE_DOCUMENT
Stores the fact that an uploaded document is related to a particular site or sites
SYS_MESSAGE
Stores all the application's error messages, warning messages and informational messages FIG. 15 lists business rules for the same embodiment of PCI as FIG. 14. In FIG. 15, the "Procedure" heading lists stored procedures that contain the most complex business rules for validation and updates. Many of the names are self-explanatory since the naming convention followed in FIG. 13 includes both the main table name that is impacted as well as the action taken on that table. In addition, the key parameters passed to the stored procedure follow the word "BY" in this naming convention. For example:
CONTACT_INSERT
EXPORT_CONTACT_DATA
CONTACT_SELECT_BY_ID selects contact information when it is passed a contact ID as a parameter In addition to the "Procedure" business rules at the start of FIG. 15, FIG. 15 also lists additional business rules listed under "Table Functions" and "Functions". These business rules select data, generally for online forms, exports or reports. They follow a similar naming convention to identify the main table from which they select data.

There are hundreds of tables and business rules included in FIGS. 14-16. Another embodiment could have far more tables to hold additional information that used to measure and improve partner capabilities. A different embodiment could have far less.

IT Reporting and Analysis

In one embodiment, reports on partner status are generated from the transaction database while additional analysis is facilitated by exporting data into CSV format for import into a spreadsheet for analysis using filters, statistics, pivot tables and pivot charts.

In one embodiment, system 100 data from the transaction database is imported into a data warehouse in order to execute standard reports, create ad hoc reports, perform business intelligence analysis and data mining. The data warehouse for one such embodiment is illustrated in FIG. 16. FIG. 16 reformats key information from the tables embodied in FIG. 14 into a data warehouse star schema to facilitate rich slicing and dicing. In one embodiment of the data warehouse concept, a data warehouse Business Intelligence, ad hoc reporting and data mining tool such as Business Objects is used. In another embodiment, a data warehouse function performs metrics and gaps calculations and then exports the results in .CSV format. End users use filters, Excel pivot tables and pivot charts to slice and dice the data.

Note: the table naming convention is different for a start schema. In a star schema, the standard table naming convention prefixes the main tables containing numbers by the word FACT_. Attribute tables related to those FACTs are prefixed by DIM_, which stands "dimension" of a fact.

In sum, IT processing, storage and reporting may be implemented in many ways including database systems, office productivity applications, applications hosted by vendors, vendor applications installed in-house, custom-built applications, email survey tools, web-based survey tools, outsourced service providers, data warehouses, etc. The whole System and Method for Managing Partners may be embodied by one or more of these tools and associated with different types of storage in different embodiments. Domain inputs to IT and the PCI methodology are isolated to make it easier to apply to any domain. The result is a flexible regimen for effecting measurable improvements in the capabilities of partner organizations.

In the above, portions of the system can be distributed as computer code on articles comprising computer readable media. Examples of articles comprising computer readable media are floppy disks, hard drives, CD-ROM or DVD media or any other read-write or read-only memory device.

Portions of the above description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system=s registers and memories into other data similarly represented as physical quantities within the computer, system memories or registers or other such information storage, transmission or display devices.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A computer-implemented method of managing partner organizations, comprising:
    defining, for each partner organization, the partner organizations that consume what it produces and the partner organizations that produce what it consumes, wherein the partner organizations form a consumer/producer hierarchy of three or more layers, including a first, second and third layer, wherein the partner organizations include a consumer/producer at the third layer, a first and a second consumer/producer at the second layer, and a first and a second consumer/producer at the first layer, wherein the first and second consumer/producers at the second layer are consumers of the consumer/producer at the third layer and wherein the first and second consumer/producers at the first layer are consumers of each of the consumer/producers at the second layer;
    defining, in a computer, partner capability objectives associated with the partner organizations at each of the first, second and third layers;
    generating, in a computer, partner capability questions corresponding to one or more of the defined partner capability objectives and automatically collecting partner capability facts from the partner organizations;
    identifying, in a computer, gaps in partner capabilities as a function of the collected partner capability facts;
    selecting one or more partner capabilities;
    automatically improving the selected partner capabilities, wherein automatically improving includes informing partner organizations at the second and third layers of gaps in their capabilities, automatically collecting partner capability facts relevant to the gaps, measuring improvement in the selected partner capabilities, and promulgating information regarding the measured improvements up through the consumer/producer hierarchy to each of the partner organizations that depend on that consumer/producer, wherein promulgating includes sending capability information received from the consumer/producer at the third layer through each of the consumer/producers at the second layer to each of the consumer/producers at the first layer;
    monitoring partner capabilities, in a computer, to ensure that improvements remain in place, wherein monitoring includes defining a monitoring plan and implementing the monitoring plan, wherein monitoring produces current partner capability information; and
    reporting to each partner organization the current partner capability information associated with partner organizations for which they are a consumer, wherein reporting includes reporting current partner capability information from partner organizations on the third layer up through partner organizations on the second layer to partner organizations on the first layer.

2. The method of claim 1, wherein informing includes making recommendations for improving a particular capability.

3. The method of claim 1, wherein informing includes providing help resources relevant to a particular capability.

4. The method of claim 3, wherein the help resources include documentation relevant to a particular capability.

5. The method of claim 1, wherein defining partner organizations includes automatically accessing third party resources to obtain data on each partner organization.

6. An article comprising a non-transitory computer readable medium having instructions thereon, wherein the instructions, when executed in a computer, create a system for executing a method of managing partner organizations, the method comprising:
    defining, for each partner organization, the partner organizations that consume what it produces and the partner organizations that produce what it consumes, wherein the partner organizations form a consumer/producer hierarchy of three or more layers, including a first, second and third layer, wherein the partner organizations include a consumer/producer at the third layer, a first and a second consumer/producer at the second layer, and a first and a second consumer/producer at the first layer, wherein the first and second consumer/producers at the second layer are consumers of the consumer/producer at the third layer and wherein the first and second consumer/producers at the first layer are consumers of each of the consumer/producers at the second layer;
    defining, in a computer, partner capability objectives associated with the partner organizations at each of the first, second and third layers;
    generating, in a computer, partner capability questions corresponding to one or more of the defined partner capability objectives and automatically collecting partner capability facts from the partner organizations;
    identifying, in a computer, gaps in partner capabilities as a function of the collected partner capability facts;
    selecting one or more partner capabilities;
    automatically improving the selected partner capabilities, wherein automatically improving includes informing partner organizations at the second and third layers of gaps in their capabilities, automatically collecting partner capability facts relevant to the gaps, measuring improvement in the selected partner capabilities, and promulgating information regarding the measured improvements up through the consumer/producer hierarchy to each of the partner organizations that depend on that consumer/producer, wherein promulgating includes sending capability information received from the consumer/producer at the third layer through each of the consumer/producers at the second layer to each of the consumer/producers at the first layer;

monitoring partner capabilities, in a computer, to ensure that improvements remain in place, wherein monitoring includes defining a monitoring plan and implementing the monitoring plan, wherein monitoring produces current partner capability information; and reporting to each partner organization the current partner capability information associated with partner organizations for which they are a consumer, wherein reporting includes reporting current partner capability information from partner organizations on the third layer up through partner organizations on the second layer to partner organizations on the first layer.

7. A system for managing partner organizations, comprising:

a data center having at least one server and a network interface that can be connected to an external network;

a database implemented on the server; and software executing on the server, wherein the software includes instructions for:

defining, for each partner organization, the partner organizations that consume what it produces and the partner organizations that produce what it consumes, wherein the partner organizations form a consumer/producer hierarchy of three or more layers, including a first, second and third layer, wherein the partner organizations include a consumer/producer at the third layer, a first and a second consumer/producer at the second layer, and a first and a second consumer/producer at the first layer, wherein the first and second consumer/producers at the second layer are consumers of the consumer/producer at the third layer and wherein the first and second consumer/producers at the first layer are consumers of each of the consumer/producers at the second layer;

defining partner capability objectives associated with the partner organizations at each of the first, second and third layers;

generating partner capability questions corresponding to one or more of the defined partner capability objectives, transmitting the questions across the external network to the partner organizations and automatically collecting partner capability facts from the partner organizations;

identifying gaps in partner capabilities as a function of the collected partner capability facts;

selecting one or more partner capabilities;

automatically improving the selected partner capabilities, wherein automatically improving includes informing partner organizations at the second and third layers of gaps in their capabilities via the external network, automatically collecting via the external network partner capability facts relevant to the gaps, measuring improvement in the selected partner capabilities, and promulgating information regarding the measured improvements up through the consumer/producer hierarchy to each of the partner organizations that depend on that consumer/producer, wherein promulgating includes sending capability information received from the consumer/producer at the third layer through each of the consumer/producers at the second layer to each of the consumer/producers at the first layer; and monitoring partner capabilities, in a computer, to ensure that improvements remain in place, wherein monitoring includes defining a monitoring plan and implementing the monitoring plan, wherein monitoring produces current partner capability information;

storing current partner capability information in the database; and reporting to each partner organization the current partner capability information associated with partner organizations for which they are a consumer, wherein reporting includes reporting current partner capability information from partner organizations on the third layer up through partner organizations on the second layer to partner organizations on the first layer.

8. The system of claim 7, wherein the database includes recommendations for improving a particular capability.

9. The system of claim 7, wherein the database includes help resources relevant to a particular capability.

10. The system of claim 7, wherein the database includes documentation that can be transferred to one or more partner organizations, wherein the documentation includes documentation relevant to a particular capability.

11. A computer-implemented method of managing partner organizations, comprising:

defining, for each partner organization, the partner organizations that consume what it produces and the partner organizations that produce what it consumes, wherein the partner organizations form a consumer/producer hierarchy of three or more layers, including a first, second and third layer, wherein the partner organizations include a consumer/producer at the third layer, a first and a second consumer/producer at the second layer, and a first and a second consumer/producer at the first layer, wherein the first and second consumer/producers at the second layer are consumers of the consumer/producer at the third layer and wherein the first and second consumer/producers at the first layer are consumers of each of the consumer/producers at the second layer;

defining, in a computer, partner capability objectives associated with the partner organizations at each of the first, second and third layers;

in a computer, collecting from each partner organization data related to the defined partner capability objectives, wherein collecting includes automatically correcting and augmenting the data collected;

automatically improving the defined partner capabilities, wherein automatically improving includes informing partner organizations at the second and third layers of gaps in their capabilities, automatically collecting partner capability facts relevant to the gaps, measuring improvement in the defined partner capabilities, and promulgating information regarding the measured improvements up through the consumer/producer hierarchy to each of the partner organizations that depend on that consumer/producer, wherein promulgating includes sending capability information received from the consumer/producer at the third layer through each of the consumer/producers at the second layer to each of the consumer/producers at the first layer;

monitoring partner capabilities, in a computer, to ensure that improvements remain in place, wherein monitoring includes defining a monitoring plan and implementing the monitoring plan, wherein monitoring produces current partner capability information; and reporting to each partner organization the current partner capability information associated with partner organizations for which they are a consumer, wherein reporting includes reporting current partner capability information from partner organizations on the third layer up through partner organizations on the second layer to partner organizations on the first layer.

12. The method of claim 11, wherein defining partner organizations includes automatically accessing third party resources to obtain data on each partner organization.

13. The method of claim 11, wherein defining partner organizations includes isolating domain input as configuration data.

14. The method of claim 11, wherein collecting data includes harvesting intelligence from partner organizations, wherein harvesting intelligence from partner organizations includes requesting best practices information from each partner organization.

15. The method of claim 11, wherein informing includes providing help resources relevant to a particular capability.

16. The method of claim 15, wherein the help resources include documentation relevant to a particular capability.

17. An article comprising a non-transitory computer readable medium having instructions thereon, wherein the instructions, when executed in a computer, create a system for executing a method of managing partner organizations, the method comprising:

defining, for each partner organization, the partner organizations that consume what it produces and the partner organizations that produce what it consumes, wherein the partner organizations form a consumer/producer hierarchy of three or more layers, including a first, second and third layer, wherein the partner organizations include a consumer/producer at the third layer, a first and a second consumer/producer at the second layer, and a first and a second consumer/producer at the first layer, wherein the first and second consumer/producers at the second layer are consumers of the consumer/producer at the third layer and wherein the first and second consumer/producers at the first layer are consumers of each of the consumer/producers at the second layer;

defining, in a computer, partner capability objectives associated with the partner organizations at each of the first, second and third layers;

in a computer, collecting from each partner organization data related to the defined partner capability objectives, wherein collecting includes automatically correcting and augmenting the data collected;

automatically improving the defined partner capabilities, wherein automatically improving includes informing partner organizations at the second and third layers of gaps in their capabilities, automatically collecting partner capability facts relevant to the gaps, measuring improvement in the defined partner capabilities, and promulgating information regarding the measured improvements up through the consumer/producer hierarchy to each of the partner organizations that depend on that consumer/producer, wherein promulgating includes sending capability information received from the consumer/producer at the third layer through each of the consumer/producers at the second layer to each of the consumer/producers at the first layer;

monitoring partner capabilities, in a computer, to ensure that improvements remain in place, wherein monitoring includes defining a monitoring plan and implementing the monitoring plan, wherein monitoring produces current partner capability information; and reporting to each partner organization the current partner capability information associated with partner organizations for which they are a consumer, wherein reporting includes reporting current partner capability information from partner organizations on the third layer up through partner organizations on the second layer to partner organizations on the first layer.

18. The method of claim 11, wherein defining partner organizations includes defining a multilevel supply chain.

19. The method of claim 11, wherein defining partner organizations includes defining a multilevel sales channel.

20. A computer-implemented method of managing impact of a disaster on one or more partner organizations, comprising:

defining, for each partner organization, the partner organizations that consume what it produces and the partner organizations that produce what it consumes, wherein the partner organizations form a consumer/producer hierarchy of three or more layers, including a first, second and third layer, wherein the partner organizations include a consumer/producer at the third layer, a first and a second consumer/producer at the second layer, and a first and a second consumer/producer at the first layer, wherein the first and second consumer/producers at the second layer are consumers of the consumer/producer at the third layer and wherein the first and second consumer/producers at the first layer are consumers of each of the consumer/producers at the second layer;

defining, in a computer, partner capability objectives associated with partner organizations at each of the first, second and third layers, wherein defining partner capability objectives includes defining a crisis management procedure, wherein defining the crisis management procedure includes determining, for each partner organization, the time needed to resume production if production at a current production site is impacted by a disaster event;

generating, in a computer, partner capability questions;

automatically collecting partner capability facts from the partner organizations corresponding to the partner capability questions;

promulgating the collected partner capability facts collected from each partner organization up through the consumer/producer hierarchy to each of the partner organizations dependent on that partner organization, wherein promulgating includes sending capability information received from the consumer/producer at the third layer through each of the consumer/producers at the second layer to each of the consumer/producers at the first layer;

identifying, in a computer, gaps in partner capabilities as a function of the collected partner capability facts, wherein identifying includes identifying gaps in the crisis management procedure;

automatically informing each partner organization of gaps in performance against their objectives, automatically collecting partner capability facts relevant to the gaps and measuring improvement in selected partner capabilities;

generating a disaster risk analysis detailing partner organizations that might be impacted by a disaster event promulgating the disaster risk analysis for the partner organization at the third layer up through the consumer/producer hierarchy to each of the partner organizations dependent on that partner organization, wherein promulgating includes sending the disaster risk analysis received from the consumer/producer at the third layer through each of the consumer/producers at the second layer to each of the consumer/producers at the first layer; and monitoring partner capabilities, in a computer, to ensure that improvements remain in place, wherein monitoring includes defining a monitoring plan and implementing the monitoring plan.

21. The method of claim 20, wherein monitoring partner capabilities includes testing the crisis management procedure and storing evidence of the test in the computer.

22. The method of claim 20, wherein determining the time needed to resume production includes determining the time needed to move production to an alternate site; and wherein identifying, in a computer, gaps in partner capabilities as a function of the collected partner capability facts includes determining if the time needed to move production to the alternate site meets their objectives.

23. The method of claim 22, wherein automatically informing includes recommending an accelerated process for moving production to the alternate site.

24. The method of claim 20, wherein monitoring partner capabilities includes detecting a disaster and communicating with partner organizations to determine the extent to which producer partner organization are impacted by the disaster.

25. The method of claim 1, wherein defining partner capability issues and objectives includes recording location information associated with each partner organization; and wherein monitoring includes detecting a disaster event and determining, from the location information associated with each partner organization, the partner organizations impacted by the disaster event.

26. The method of claim 20, wherein defining partner capability issues and objectives includes recording location information associated with each partner organization; and wherein monitoring includes detecting a disaster event and determining, from the location information associated with each partner organization, the partner organizations impacted by the disaster event.

27. The method of claim 26, wherein automatically informing each producer partner organization of gaps in performance against their objectives includes detecting producer partner organizations at risk from dependence on the same producer partner organization and informing their consumer partner organizations of the shared risk.

28. The method of claim 26, wherein automatically informing each producer partner organization of gaps in performance against their objectives includes detecting lack of contingency plans.

29. The method of claim 26, wherein automatically informing each producer partner organization of gaps in performance against their objectives includes identifying if two or more producer partner organizations are vulnerable to production risk due to dependence on the same single outsourced good or service.

30. The method of claim 1, wherein the consumer/producer at the third layer is a consumer of the consumer/producer at the first layer.

* * * * *